United States Patent
Pertierra et al.

(10) Patent No.: US 10,416,539 B2
(45) Date of Patent: Sep. 17, 2019

(54) SPATIAL LIGHT MODULATOR FOR REDUCTION OF CERTAIN ORDER LIGHT

(71) Applicant: Dolby Laboratories Licensing Corporation, San Francisco, CA (US)

(72) Inventors: Juan P. Pertierra, Indianapolis, IN (US); Martin J. Richards, Gig Harbor, WA (US); Barret Lippey, Foster City, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 16/012,575

(22) Filed: Jun. 19, 2018

(65) Prior Publication Data
US 2018/0373129 A1    Dec. 27, 2018

Related U.S. Application Data

(60) Provisional application No. 62/523,213, filed on Jun. 21, 2017.

(30) Foreign Application Priority Data

Aug. 14, 2017 (EP) .................................... 17186142

(51) Int. Cl.
*G03B 21/00* (2006.01)
*G02F 1/1335* (2006.01)
(Continued)

(52) U.S. Cl.
CPC ............ *G03B 21/005* (2013.01); *G02B 5/20* (2013.01); *G02B 5/3025* (2013.01); *G02B 26/06* (2013.01);
(Continued)

(58) Field of Classification Search
CPC .... G03B 21/006; G03B 21/2066; G02B 5/20; G02B 5/3025
See application file for complete search history.

(56) References Cited

U.S. PATENT DOCUMENTS 5,041,851 A   8/1991 Nelson
5,694,189 A   12/1997 Nakamura
(Continued)

FOREIGN PATENT DOCUMENTS

EP   0005245   11/1979
EP   2869104   5/2015
JP   2007-199192   8/2007

OTHER PUBLICATIONS

Yang, X. et al "Holographic Display Using Two On-axis Holograms without the Zeroth-Order Light and the Twin Image" May 24-28, 2015, OSA publishing.

*Primary Examiner* — Sultan Chowdhury
*Assistant Examiner* — Magda Cruz

(57) ABSTRACT

A novel spatial light modulator (SLM) includes a cover glass, and modulation layer, and a plurality of pixel mirrors, and separates unwanted, reflected light from desired, modulated light. In one embodiment, a geometrical relationship exists between the cover glass and the pixel mirrors, such that light that reflects from the cover glass is separated from light that reflects from the pixel mirrors and is transmitted from the SLM. In one example, one of the cover glass or the pixel mirrors is angled with respect to the modulation layer. In another example embodiment, the cover glass has a particular thickness, which introduces destructive interference between light that reflects from the top and bottom surfaces of the cover glass. In another embodiment antireflective coatings are disposed between optical interfaces of the SLM. In another embodiment, light from the SLM is directed through an optical filter to remove unwanted light.

19 Claims, 17 Drawing Sheets

(51) Int. Cl.
*G02F 1/1347* (2006.01)
*G02B 26/06* (2006.01)
*G03H 1/22* (2006.01)
*H04N 9/31* (2006.01)
*G02B 5/20* (2006.01)
*G02B 5/30* (2006.01)
*G03B 21/20* (2006.01)

(52) U.S. Cl.
CPC .... *G02F 1/13471* (2013.01); *G02F 1/133502* (2013.01); *G02F 1/133512* (2013.01); *G02F 1/133553* (2013.01); *G03B 21/006* (2013.01); *G03B 21/2066* (2013.01); *G03H 1/2294* (2013.01); *H04N 9/3126* (2013.01); *G02F 2201/38* (2013.01); *G02F 2203/50* (2013.01); *G03H 2001/2218* (2013.01)

(56) References Cited

U.S. PATENT DOCUMENTS

| | | |
|---|---|---|
| 5,949,503 A | 9/1999 | Koyama |
| 6,678,085 B2 | 1/2004 | Kowarz |
| 7,573,631 B1 | 8/2009 | Amm |
| 8,077,377 B2 | 12/2011 | Sandstrom |
| 8,159,733 B2 | 4/2012 | Christmas |
| 8,186,833 B2 | 5/2012 | Govil |
| 8,390,781 B2 | 3/2013 | Laidig |
| 8,670,106 B2 | 3/2014 | Chen |
| 9,025,136 B2 | 5/2015 | Chen |
| 9,363,582 B2 | 6/2016 | Chu |
| 9,395,690 B2 | 7/2016 | Futterer |
| 2005/0213192 A1 | 9/2005 | Murtagh |
| 2015/0185523 A1 | 7/2015 | Matsumoto |
| 2016/0025992 A1 | 1/2016 | Van Der Zouw |
| 2017/0017076 A1 | 1/2017 | Guillon |
| 2017/0085846 A1* | 3/2017 | Damberg ............... G02B 26/06 |

* cited by examiner

SPATIAL LIGHT MODULATOR FOR REDUCTION OF CERTAIN ORDER LIGHT

CROSS-REFERENCE TO RELATED APPLICATIONS

This application claims the benefit of priority from U.S. Provisional Patent Application No. 62/523,213 filed Jun. 21, 2017 and European Patent Application No. 17186142.0 filed Aug. 14, 2017, which are hereby incorporated by reference in its entirety.

BACKGROUND OF THE INVENTION

Field of the Invention

This invention relates generally to spatial light modulators, and more particularly to spatial light modulators for producing images with high contrast.

Description of the Background Art

Spatial light modulators (SLMs) are known. SLMs are typically sectioned into pixels, with each pixel being driven separately to introduce a spatially varying change in an incident lightfield. Through spatial variation of lightfields, SLMs can be used to generate a pre-defined image from a spatially homogenous lightfield. SLMs include amplitude modulators, which attenuate the amplitude of incident light, and phase modulators, which alter the phase of incident light. Both amplitude modulators and phase modulators have significant drawbacks.

Amplitude modulators utilize liquid crystals, for example, to variably darken areas within the incident lightfield that correspond to individual pixels of the modulator. An image is formed by darkening each pixel in an amount that corresponds to the brightness of a corresponding region of the desired image. Liquid crystals control amplitude by varying phase, which varies polarization due to the birefringent nature of the liquid crystals, and utilizing external polarizers (or polarizers built into the modulator) to convert the polarization change to an amplitude change. Typical amplitude modulators have a relatively low limit for achievable contrast, because, among other things, reflections (i.e., $0^{th}$ order light) from various refractive interfaces within the devices brighten regions on the resultant image that are intended to be dark.

Phase modulators utilize, for example, liquid crystals to variably introduce a phase change to areas of the incident light that correspond to individual pixels of the modulator. The phase changes introduce interference between light from different pixels, effectively steering the modulated light in a predictable manner. An image is formed by steering light toward brighter areas of the image and away from darker areas of the image. Known phase modulators have a relatively low limit for achievable contrast in images with a total irradiance that is significantly dimmer than the incident lightfield, because unwanted light is not attenuated, as in an amplitude modulator.

FIG. 1 is a cross-sectional view of an example SLM 100 according to the prior art. SLM 100 includes a cover glass 102, an electrode 104, a liquid crystal layer 106, a dielectric layer 108, and a plurality of pixel mirrors 110 formed on a substrate 112. Light is incident on cover glass 102 at an angle. Most of the incident light is transmitted into cover glass 102, but a portion of the incident light is reflected at an angle θ with respect to the normal to cover glass 102, which is equal to the angle of the incident light with respect to the normal to cover glass 102. Another portion of the transmitted light is reflected from the bottom surface of cover glass 102 and is transmitted from cover glass 102 at an identical angle θ. The rest of the transmitted light travels through the various layers of SLM 100 (being modulated by liquid crystal layer 106 on the way), reflects off pixel mirrors 110, travels back through the various layers of SLM 100, and is transmitted into the surrounding area at an identical angle θ. Because each of the unwanted, reflected portions of light are traveling at the same angle with respect to cover glass 102 as the desired, modulated light, they will follow the same path, thus, decreasing the overall contrast of the resultant image.

SUMMARY

The present disclosure is directed at providing a spatial light modulator having high contrast. In one example, a particular geometrical relationship between the cover glass and the pixel mirrors introduces angular diversity between rays of the modulated light and corresponding rays of the unmodulated, reflected light. In another example, the geometry of the cover glass introduces destructive interference between light reflected from the top and bottom surfaces of the cover glass. In yet another example, an optical filter is used to filter unwanted light from the generated image. In yet another example, antireflective coatings are disposed between layers of the spatial light modulator to eliminate reflections at refractive interfaces.

An exemplary spatial light modulator includes a substrate, a pixel mirror formed on the substrate, a modulation layer, and a transparent cover. The pixel mirror is configured to reflect light and to have an operational voltage asserted thereon. The modulation layer is disposed over the pixel mirror and configured to modulate light based, at least in part, on the operational voltage asserted on the pixel mirror. The transparent cover is disposed over the modulation layer and has a predetermined geometrical relationship with the pixel mirror. A first portion of light incident on the transparent cover is reflected as unmodulated light. A second portion of light incident on the transparent cover passes through the transparent cover, passes through the modulation layer, is reflected by the pixel mirror, passes through the modulation layer again, and is transmitted by the transparent cover as modulated light. The geometrical relationship is such that the unmodulated light is separated from the modulated light.

In examples, the geometrical relationship is configured to introduce an angular difference between the unmodulated light and the modulated light. In one example, the geometrical relationship includes the pixel mirror having a top surface oriented substantially parallel with respect to the substrate, and the transparent cover having a top surface oriented at a non-zero angle with respect to the substrate. In another example, the geometrical relationship includes the pixel mirror having a top surface oriented at a non-zero angle with respect to the substrate, and the transparent cover having a top surface oriented substantially parallel with respect to the substrate.

In yet other examples, the geometrical relationship eliminates at least some of the unmodulated light by destructive interference. In one example spatial light modulator, the geometrical relationship includes the transparent cover having a top surface and a bottom surface, the top surface being oriented substantially parallel with respect to the bottom surface. In addition, the top surface and the bottom surface are separated by a particular distance, such that some of the unmodulated light that reflects from the top surface and some of the unmodulated light that reflects from the bottom surface have a predetermined phase difference. In a more particular example, the predetermined phase difference is equal to one half of a wavelength of the incident light.

Yet other example spatial light modulators employ anti-reflective coatings. One example additionally includes an electrode layer formed between the modulation layer and the transparent cover, and an anti-reflective coating positioned between the electrode layer and the transparent cover or between the electrode layer and the modulation layer. Another example additionally includes an electrode layer formed between the modulation layer and the transparent cover, a first anti-reflective coating positioned between the electrode layer and the transparent cover, and a second anti-reflective coating positioned between the electrode layer and the modulation layer. In disclosed examples, the modulation layer is a liquid crystal layer and, optionally, the second anti-reflective coating is optimized for the liquid crystal layer being in its black state.

Example methods of manufacturing a high contrast spatial light modulator are also disclosed. One example method includes providing a substrate and forming a pixel mirror on the substrate. The pixel mirror is configured to reflect light and to have an operational voltage asserted thereon. The example method additionally includes providing a modulation layer over the pixel mirror. The modulation layer is operable to modulate light passing therethrough based at least in part on the operational voltage. The example method additionally includes providing a transparent cover over the modulation layer. The transparent cover reflects a first portion of light incident on the transparent cover as unmodulated light, transmits a second portion of light incident on the transparent cover through the modulation layer toward the pixel mirror, and transmits the second portion of light reflected from the pixel mirror as modulated light. The pixel mirror and the transparent cover have a geometrical relationship such that the unmodulated light is separated from the modulated light.

In a particular example method, the geometrical relationship is configured to introduce an angular separation between the unmodulated light and the modulated light. In another particular example method, the geometrical relationship includes the pixel mirror having a top surface oriented substantially parallel with respect to the substrate, and the transparent cover having a top surface oriented at a nonzero angle with respect to the substrate. In another particular example method, the geometrical relationship includes the pixel mirror having a top surface oriented at a nonzero angle with respect to the substrate, and the transparent cover having a top surface oriented substantially parallel with respect to the substrate.

In other particular examples, the geometrical relationship eliminates at least some of the unmodulated light by, for example, destructive interference and/or anti-reflective coatings. In one example method, the geometrical relationship includes the transparent cover having a top surface and a bottom surface, the top surface being oriented substantially parallel with respect to the bottom surface. In addition, the top surface and the bottom surface are separated by a particular distance, such that some of the unmodulated light that reflects from the top surface and some of the unmodulated light that reflects from the bottom surface have a predetermined phase difference. In a disclosed method, the phase difference is equal to one half of a wavelength of the incident light.

Another disclosed method additionally includes forming an electrode layer between the modulation layer and the transparent cover, and forming a first anti-reflective coating between the electrode layer and the transparent cover or between the electrode layer and the modulation layer. Yet another disclosed method additionally includes forming an electrode layer between the modulation layer and the transparent cover, forming a first anti-reflective coating between the electrode layer and the transparent cover, and forming a second anti-reflective coating between the electrode layer and the modulation layer. In a particular example method, the step of forming a modulation layer over the pixel mirror includes applying a liquid crystal layer above the pixel mirror, and the second anti-reflective coating is optimized when the liquid crystal layer is in its black state.

An example image projector is also disclosed. The example image projector includes a controller, a light source, a phase modulating spatial light modulator (PMSLM), an optical component, a filter, and an amplitude modulating spatial light modulator (AMSLM). The controller is operative to receive image data and to provide control signals based at least in part on the image data. The light source is configured to provide an illumination beam. The PMSLM is configured to selectively steer portions of the illumination beam, to create a modulated illumination beam, responsive to signals from the controller. The modulated illumination beam includes light modulated by the PMSLM and unmodulated light reflected from the PMSLM. The optical component is disposed in the path of the modulated illumination beam, and the filter is disposed at or near a Fourier plane of the optical component. The filter is operative to at least partially block the unmodulated light reflected from the PMSLM to create a filtered, modulated illumination beam. The AMSLM is disposed in the filtered, modulated illumination beam and configured to selectively modulate the amplitude of portions of the filtered, modulated illumination beam to create an imaging beam, which can be projected onto a display surface by projection optics.

In a particular exemplary projector, the filter includes an opaque region at a center of the filter. In another particular example projector, the filter includes an opaque region disposed on an optical axis of the optical component. In yet another particular example projector, the filter includes a polarized region at a center of the filter. Optionally, the filter is rotatable about an axis passing through the polarized region.

Various features of the disclosed filters can be used in combination. For example, in one example projector, the filter includes an opaque region displaced from an optical axis of the optical component, and the PMSLM is operative to steer unwanted light toward the opaque region. In this example projector, the filter also includes a second opaque region disposed on the optical axis of the optical component. In another example projector, the filter includes an opaque region disposed to block the unmodulated light, and the PMSLM steers unwanted, modulated light toward the opaque region.

An exemplary disclosed projector is capable of filtering the $0^{th}$ order reflected light, while preserving the DC component of the generated lightfield. In the exemplary projector, the controller is configured to determine a first set of steering angles required to provide a desired light field based at least in part on the received image data. Each angle of the first set of steering angles is confined to a predetermined range of angles. The controller adds a predetermined lightfield steering angle to every steering angle of the first set of steering angles contributing to the lightfield to generate a set of adjusted steering angles. The adjusted steering angles all have values that differ from zero by a predetermined amount. The controller then provides control signals to the PMSLM, causing the modulated light to be steered at the adjusted steering angles, thereby preventing the filter from blocking a DC component of the lightfield.

In a particular example projector, the first set of steering angles is in a range of −θ to +θ, the predetermined lightfield steering angle is Φ, and |Φ|>|θ|.

An exemplary method of improving contrast in a projected image is also disclosed. The exemplary method includes receiving image data, and selectively steering portions of an illumination beam to generate a desired light field based at least in part on the image data. The method additionally includes separating reflected, unsteerable portions of the illumination beam from the lightfield, modulating the lightfield to generate an image corresponding to the received image data. In a particular exemplary method, the step of separating includes introducing an angular disparity between the steered portions and the reflected, unsteerable portions of the illumination beam. In another exemplary method, the step of separating includes reducing the reflected, unsteerable light by destructive interference. In yet another exemplary method, the step of separating includes filtering the reflected, unsteerable portions of the illumination beam from the steered portions of the illumination beam.

In disclosed methods, the filtering includes preserving the DC component of the lightfield. For example, in one method, preserving the DC component of the lightfield includes steering all of the lightfield by an amount sufficient to ensure that all portions of the illumination beam generating the lightfield are steered at angles that differ from zero by a predetermined amount. In a particular exemplary method, preserving the DC component of the lightfield includes determining a first set of steering angles required to generate the desired light field based at least in part on the received image data. The first set of steering angles is confined to a predetermined range of angles. The method additionally includes adding a predetermined lightfield steering angle to every steering angle of the first set of steering angles contributing to the lightfield to generate a set of adjusted steering angles. The adjusted steering angles all have values that differ from zero by a predetermined amount. For example, the first set of steering angles is in a range of −θ to +θ, the predetermined lightfield steering angle is Φ, and |Φ|>|θ|.

BRIEF DESCRIPTION OF THE DRAWINGS

Aspects of the present disclosure are described in more detail with reference to the following drawings, wherein like reference numbers denote substantially similar elements.

DETAILED DESCRIPTION

The present disclosure provides a spatial light modulator (SLM) configured to separate unwanted light from modulated light, in order to increase contrast in displayed images. In one example, a modulator introduces angular diversity between the modulated light rays and reflected, unmodulated light rays through varying cover glass and/or pixel mirror geometries and/or relationships therebetween. In another example, a filter associated with the modulator is configured to block or attenuate unwanted light. In the following description, numerous specific details are set forth (e.g., particular geometries, optical elements, spatial light modulator (SLM) types, etc.) in order to provide a thorough understanding of several aspects of the present disclosure. Those skilled in the art will recognize, however, that said aspects may be made use of apart from these specific details. For instance, examples are shown that include liquid crystal SLMs. However, aspects of the disclosure can be employed using other types of SLMs including, but not limited to, digital mirror devices (DMDs), microelectromechanical systems (MEMS) devices, and any other SLM that might possibly generate unwanted reflections that reduce image quality. In other instances, details of well-known projection practices (e.g., spatial light modulation, image data processing, manufacturing, routine optimization, etc.) and components have been omitted, so as not to unnecessarily obscure the present disclosure.

In the description of examples certain SLMs are referred to as "phase modulating" and other SLMs are referred to as "amplitude modulating" to distinguish between an SLM that is used to steer light to create a lightfield on a primary modulator and an SLM that modulates selected portions of the lightfield to create an image for viewing. However, these terms are not used in a limiting sense. For example, DMDs selectively steer light along or out of an optical path, but are used as amplitude modulators by time multiplexing the amount of light steered into or out of an image to create an intermediate gray level (perceived amplitude modulation).

As another example, liquid crystal SLMs selectively alter the phase of light and can, therefore, be considered a phase modulating or beam steering device. However, the birefringent property of liquid crystals also results in polarization rotation, and so liquid crystal SLMs can be used with internal or external polarizers to provide amplitude modulation. Therefore, devices referred to as "amplitude modulating", "phase modulating", or "beam steering" are understood to include any device capable of performing the titled function, either alone or in combination with other devices.

Figure 1:
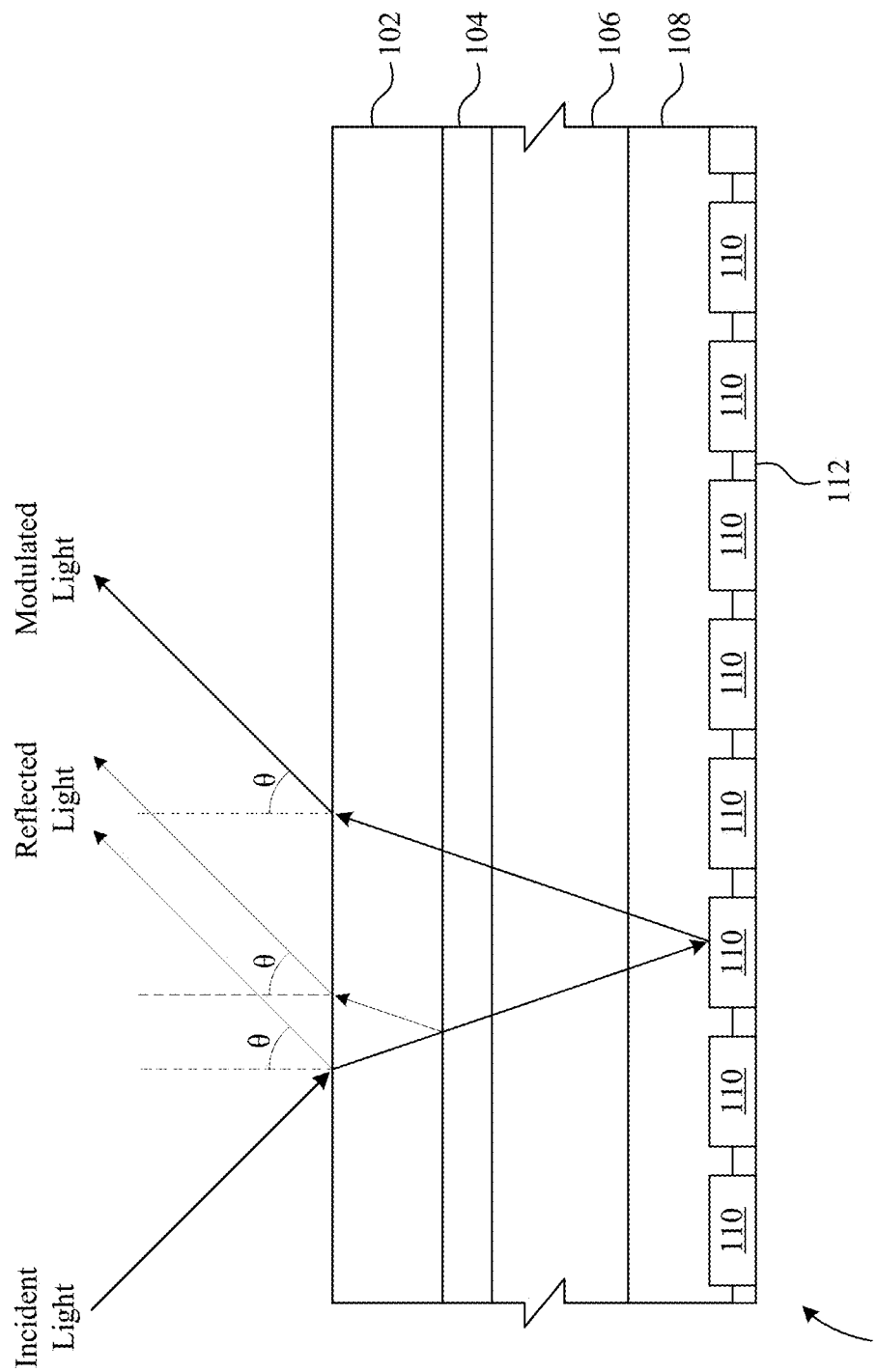
FIG. 1 is a cross-sectional view of an exemplary spatial light modulator (SLM) according to the prior art.
Figure 2:
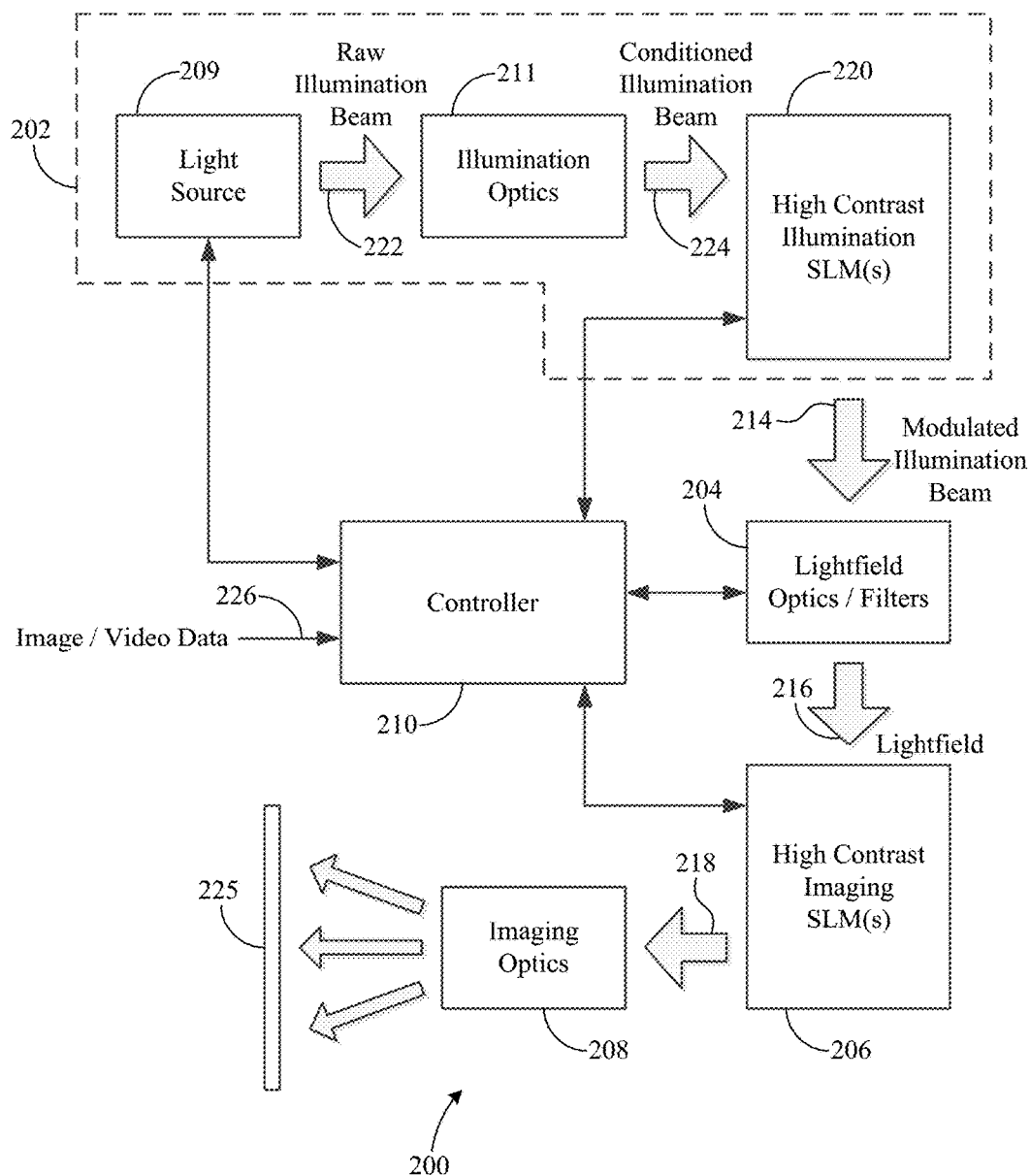
FIG. 2 is a block diagram showing an exemplary projection system, including SLMs.

FIG. 2 is a block diagram of an image projector 200 capable of producing high contrast images. Image projector 200 includes an illumination source 202, lightfield optics/filters 204, high contrast imaging SLM(s) 206, imaging optics 208, and a controller 210.

In this particular example, projector 200 is a dual modulation projector. Dual modulation increases the dynamic range of projector 200 by reducing light leakage at imaging SLM(s) 206. For example, the pixels of imaging SLM(s) 206 that are displaying darker areas of an image are illuminated with less intense light, thereby decreasing the amount of required attenuation by imaging SLM(s) 206. As a result, the light output of dark pixels is closer to 0%, which improves the dynamic range of projector 200.

Illumination source 202 includes a plurality of individually controllable light valves, which facilitate the emission of a modulated illumination beam 214. In this example, illumination source 202 includes a light source 209, illumination optics 211, and high contrast illumination SLM(s) 220. Light source 209 generates a raw illumination beam 222, and directs raw illumination beam 222 toward illumination optics 211. Illumination optics 211 conditions raw illumination beam 222 to generate a conditioned illumination beam 224 and directs conditioned illumination beam 224 to evenly impinge on illumination SLM(s) 220. Illumination SLM(s) 220 modulate conditioned illumination beam 224 to produce modulated illumination beam 214 responsive to illumination data provided by controller 210. In this example, the individually controllable light valves of illumination source 202 are pixels (or groups of pixels) of illumination SLM(s) 220, which is/are reflective liquid crystal phase modulators capable of steering light beams at desired angles.

Lightfield optics/filters 204 receives modulated imaging beam 214 and alters/redirects modulated imaging beam 214 in a predetermined way, in order to illuminate high contrast imaging SLM(s) 206 with a desired lightfield 216. Although shown as a beam transmitted from lightfield optics/filters 204 to imaging SLM(s) 206 for illustrative purposes, lightfield 216 is more accurately described as the light impinging on the modulating surface(s) of imaging SLM(s) 206.

Imaging SLM(s) 206, responsive to image data from controller 210, modulate(s) lightfield 216 to infuse an imaging beam 218 with an image corresponding to the image data, and directs imaging beam 218 to imaging optics 208. Imaging optics 208 focuses imaging beam 218 on a viewing surface 225, where the projected images can be viewed (e.g., on a movie theater screen).

Controller 210 receives image/video data from a source (not shown) via data input 226, adjusts the image data depending on lightfield 216, which is simulated by controller 210, and provides the adjusted image data to imaging SLM(s) 206.

In the example, illumination SLM(s) 220 and imaging SLM(s) 206 are high contrast spatial light modulators. SLM(s) 220 and 206 increase contrast by redirecting unwanted light that reflects from optical interfaces of SLM(s) 220 and 206 (i.e. $0^{th}$ order light) away from the desired, modulated light (i.e. $P^t$ order light). The present disclosure presents various particular examples of SLM(s) 220 and 206 that generate high contrast images as illustrative examples, but it should be understood that the illustrative examples disclosed are not limiting. For example, SLM(s) 220 and 206 are shown in the following examples as liquid crystal SLMs. However, SLM(s) 220 and 206 can be any SLMs having a cover glass or other front reflective surface, including, but not limited to, digital micro-mirror devices, multi-element mirror devices, microelectromechanical devices, and/or any other spatial light modulators, including those yet to be invented.

Figure 3:
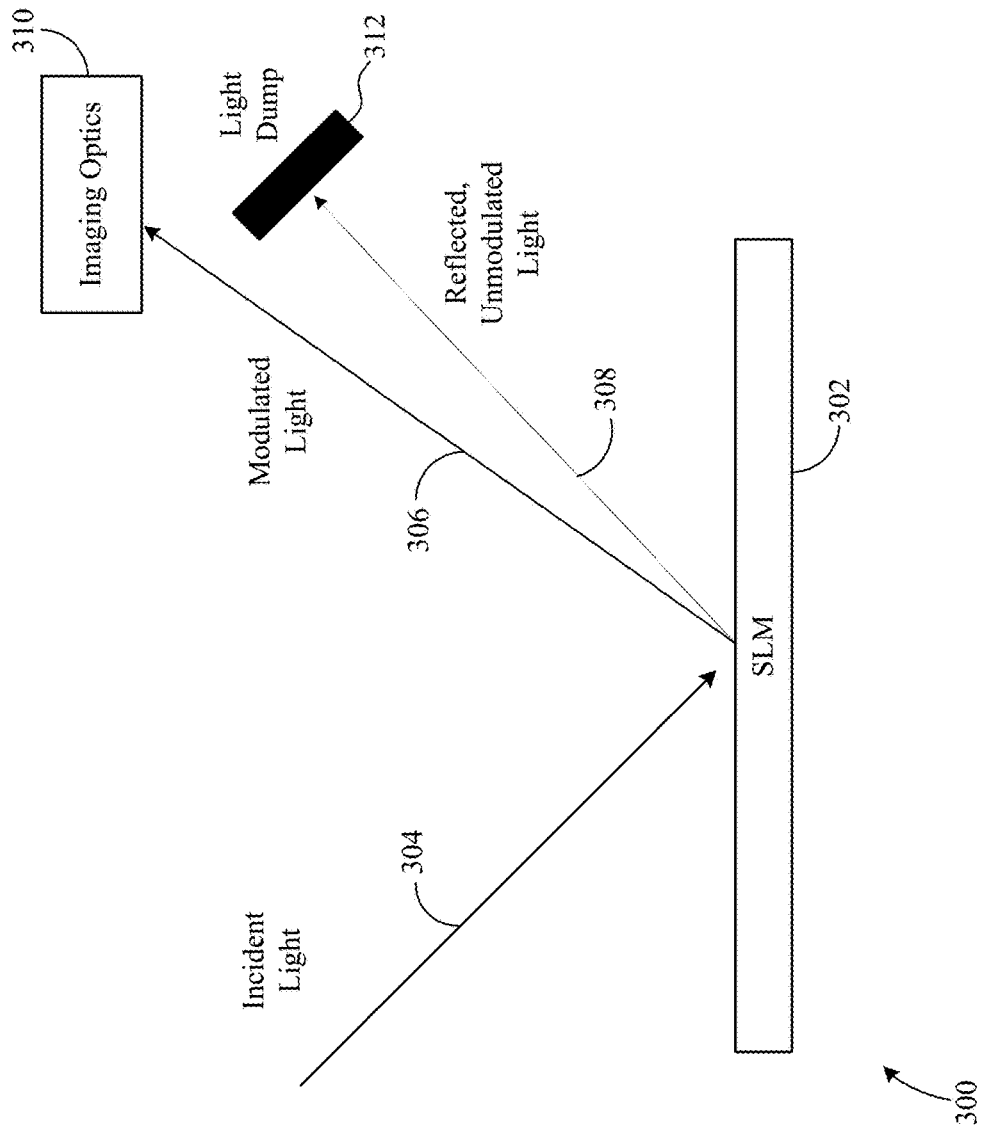
FIG. 3 is a block diagram illustrating a principle of operation of an exemplary SLM suitable for use in the projection system of FIG. 2.

FIG. 3 is a block diagram illustrating a principle of operation of an example SLM 302 suitable for use in projection system 200 as, for example, SLM(s) 206 and/or 220. Incident light 304 (e.g., conditioned illumination beam 224 or lightfield 216) impinges on SLM 302. SLM 302 modulates a portion of the incident light, but another portion of the light reflects from various refraction interfaces on/within SLM 206 and remains unmodulated. SLM 302 is configured to create an angular diversity between the modulated light 306 and the reflected, unmodulated light 308, such that modulated light 306 is directed toward imaging optics 310, and reflected, unmodulated light 308 is directed toward and absorbed by a light dump 312. SLM 302 is capable of producing images with relatively high contrast because the unwanted, reflected light that normally pollutes displayed images is instead eliminated.

Figure 4:
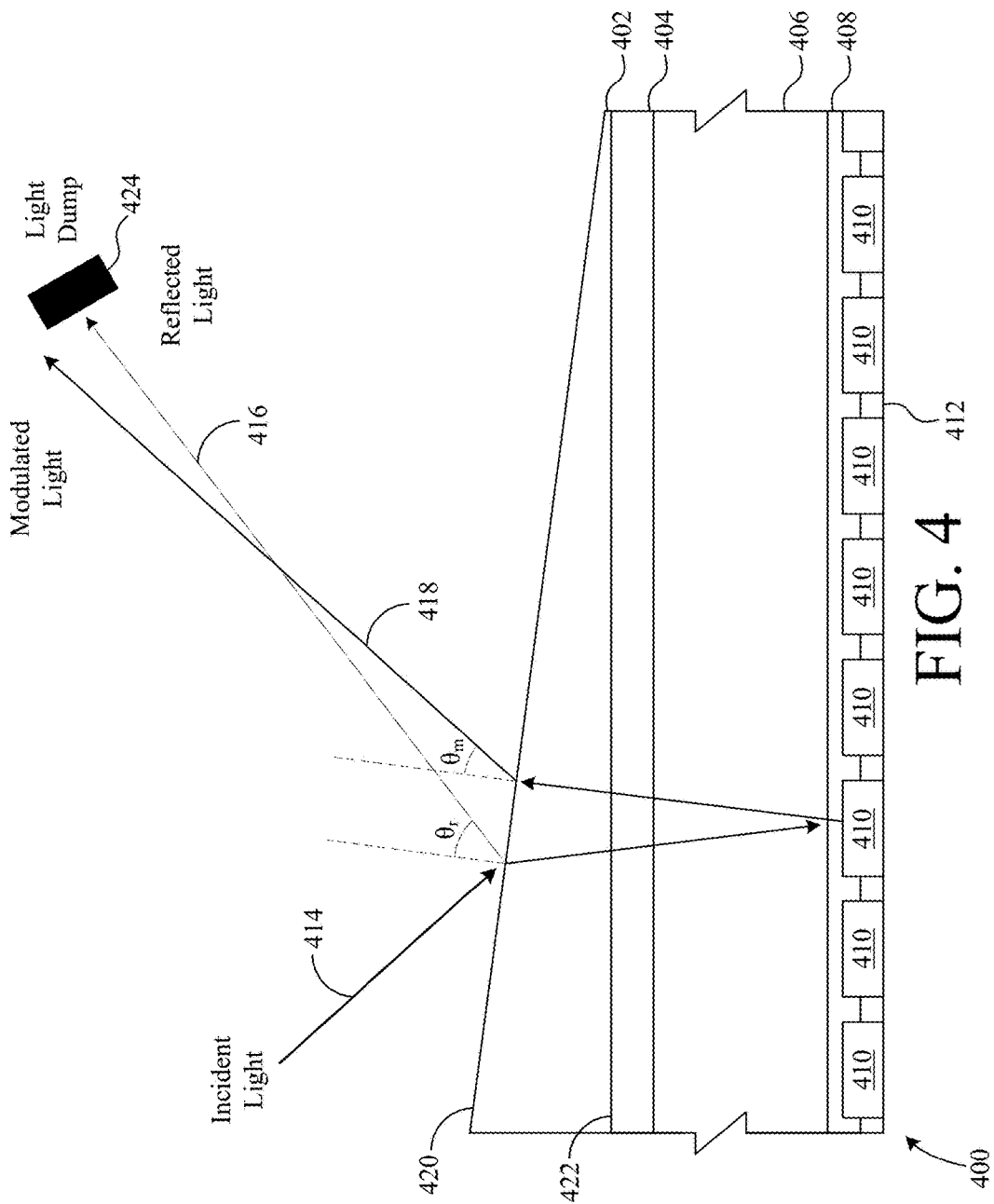
FIG. 4 is a cross-sectional view of an exemplary SLM employing the operational principle of FIG. 3.

FIG. 4 is a cross-sectional view of an example SLM 400 employing the operational principle of angular diversity illustrated in FIG. 3. SLM 40 includes a cover glass 402, a transparent electrode 404, a liquid crystal layer 406, a dielectric layer 408, and a plurality of pixel mirrors 410 formed on a substrate 412. SLM 400 spatially modulates incident light 414 by introducing a spatially varying voltage across liquid crystal layer 406. Electrode 404 is held at a reference voltage and each of pixel mirrors 410 has an operational voltage asserted thereon. The operational voltages asserted on pixel mirrors 410 generate a spatially varying electric field across liquid crystal layer 406. This electric field causes optically relevant properties of the liquid crystals to vary spatially. This spatial variation introduces a spatially varying polarization and/or phase adjustment into the light that travels through liquid crystal layer 406. The spatially modulated light is eventually utilized to generate images.

Cover glass 402 has a particular geometry configured to introduce angular diversity between the modulated light 418 and reflected, unmodulated light 416. Cover glass 402 has an angled top surface 420 with respect to its bottom surface 422. The magnitude of the angle is greatly exaggerated in FIG. 4 for illustrative purposes. Incident light 414 is mostly transmitted through cover glass 402 and into SLM 400, but about four percent (4%) of the light is reflected at an angle $\theta_r$ equal to the angle of incidence of light 414 on top surface 420. Due to the nonparallel orientation of top surface 420, the transmitted light is incident on pixel mirrors 410 at a slightly smaller angle of incidence, as compared to the case where top surface 420 is parallel to the top surfaces of pixel mirrors 410. The resulting slightly smaller angle of reflection from pixel mirrors 410, in combination with refraction by angled top surface 420, causes the transmitted, modulated light 418 to be refracted, upon exiting cover glass 402, at an angle $\theta_m$ that is not equal to the angle $\theta_r$ of the unmodulated reflected light 416. Therefore, the modulated light can be directed toward imaging optics 208 (FIG. 2) and the reflected light can be directed toward a light dump 424, because they do not travel in the same direction. The removal of unmodulated light 416 from modulated light 418 results in an eventual image with higher contrast.

In the example, only top surface 420 is oriented not parallel with respect to pixel mirrors 410. In alternate examples, any additional surfaces, layers, and/or interfaces of SLM 400 can be oriented not parallel with respect to pixel mirrors 410. Additionally, the angle of surfaces, layers, and/or interfaces of SLM 400 can be made progressively steeper (or shallower) as a function of height in SLM 400. For example, if top surface 420 is angled 5 degrees with respect to pixel mirrors 410, then bottom surface 422 can be angled 4 degrees with respect to pixel mirrors 410, a bottom surface of electrode 404 can be angled 3 degrees with respect to pixel mirrors 410, and so on. In addition, cover glass 402 can be designed with a variety of alternate geometries, including, but not limited to, spherical/aspherical, convex/concave, randomized, and grating surfaces and periodic arrays, in order to introduce angular diversity between modulated light 418 and unmodulated light 416. Changes in the geometry of the cover glass that eliminate unmodulated light 416 can introduce complex changes in the resulting lightfield at, for example, a primary modulator. The complex changes in the lightfield can be accommodated by complementary changes in the structure of the primary modulator and/or image data driving the primary modulator.

Figure 5:
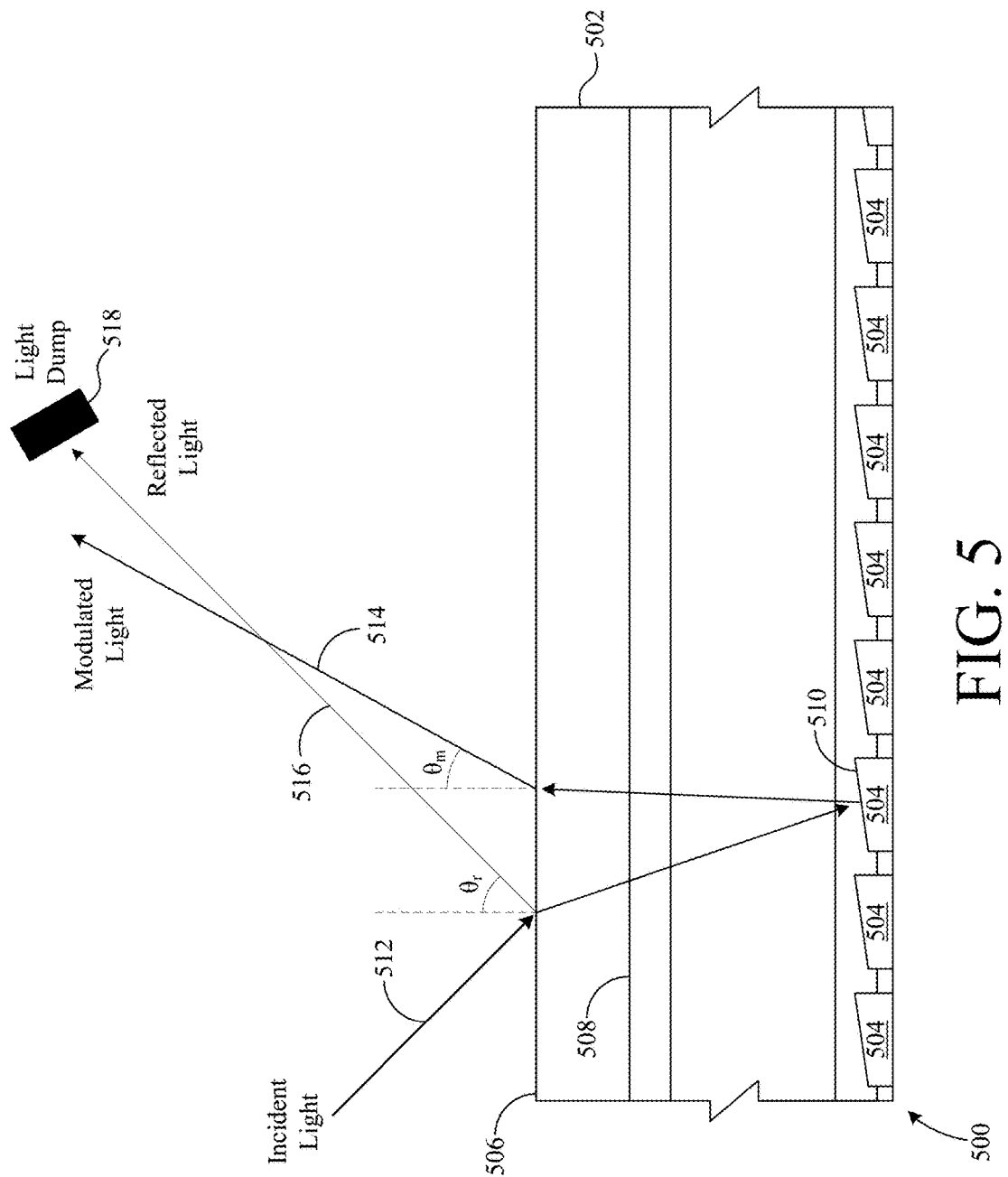
FIG. 5 is a cross-sectional view of an alternate exemplary SLM employing the operational principle of FIG. 3.

FIG. 5 is a cross-sectional view of an alternate example SLM 500 employing the operational principle of angular diversity illustrated in FIG. 3. SLM 500 is substantially similar to SLM 400 except for a cover glass 502 and pixel mirrors 504. Cover glass 502 has a top surface 506 that is substantially parallel to its bottom surface 508, and to most other structures/layers of SLM 500, except for pixel mirrors 504. Instead, the top surface 510 of each pixel mirror 504 forms a nonzero angle with respect to surfaces 506 and 508 of cover glass 502. When incident light 512 is transmitted through top surface 506 of cover glass 502, it is refracted at a particular angle with respect to the normal of top surface 506. Because the top surfaces 510 of pixel mirrors 504 are tilted with respect to top surface 506 of cover glass 502, the modulated light reflected by pixel mirrors 504 has a smaller angle of incidence on the back surface of cover glass 502 and is, therefore, refracted by cover glass 502 at a smaller angle $\theta_m$ than the angle of reflection $\theta_r$ of incident light 512. The angular diversity allows modulated light to be directed toward additional system optics (such as imaging optics 208) and reflected light 516 to be directed toward a light dump 518. As a result, an image generated from modulated light 514 will have higher contrast. Additionally, pixel mirrors 510 favor angled illumination, and, therefore, this particular example reflects light more efficiently.

Figure 6:
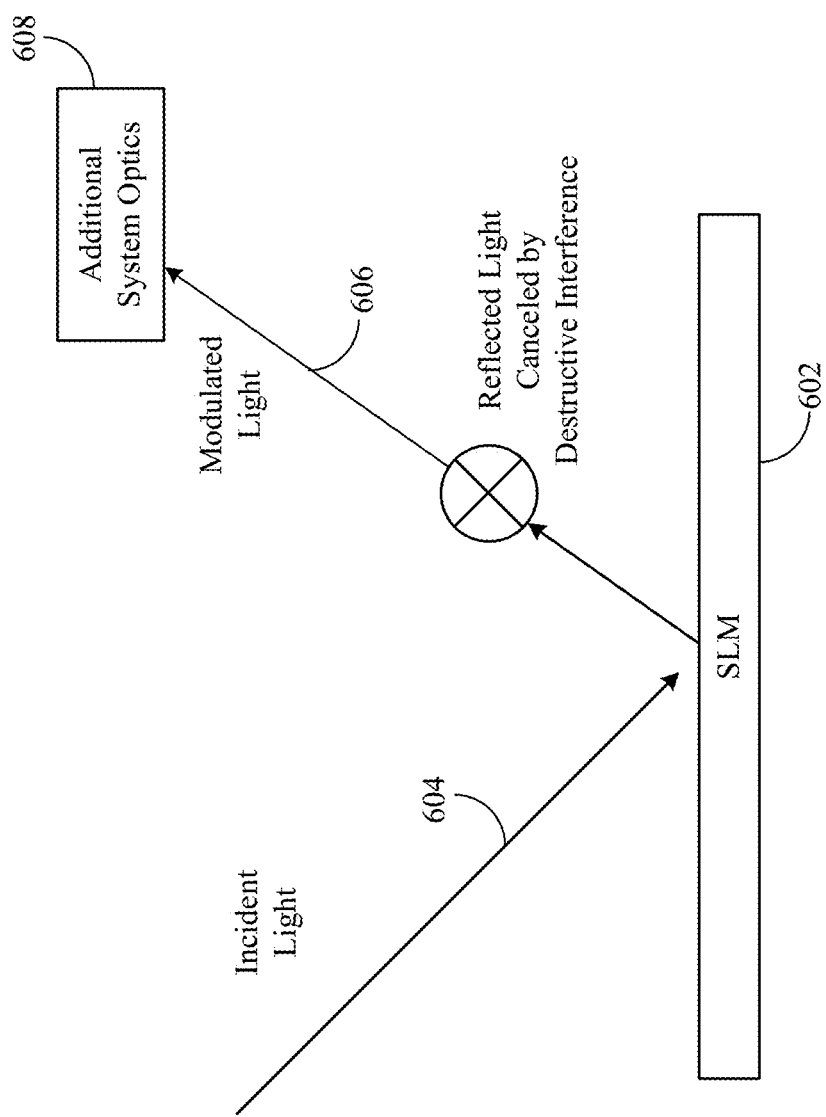
FIG. 6 is a block diagram illustrating an alternate principle of operation of an exemplary SLM suitable for use in the projection system of FIG. 2.

FIG. 6 is a block diagram illustrating an alternate principle of operation of an example SLM 602 suitable for use in projection system 200. SLM 602 utilizes destructive interference to eliminate/reduce reflected light, in order to increase contrast in a resultant image. SLM 602 modulates a portion of incident light 604 to form modulated light 606, and directs modulated light 606 toward additional system optics 608 (e.g., lightfield optics/filter 204). Another portion of the incident light reflects from upper layers of SLM 602 and, therefore, escapes modulation. However, the thicknesses of the upper layers can be selected to eliminate the reflected light through destructive interference. In particular, the thickness of one or more upper layers (e.g., a cover glass) is specifically calibrated to induce a phase difference of pi (i.e. one-half wavelength) between the light reflected from a bottom surface of the layer and a top surface of the layer. The phase change causes the light reflected from the bottom surface of the layer to destructively interfere with the light reflected from the top surface of the layer. The destructive interference significantly reduces the intensity of the reflected, unmodulated light.

Figure 7:
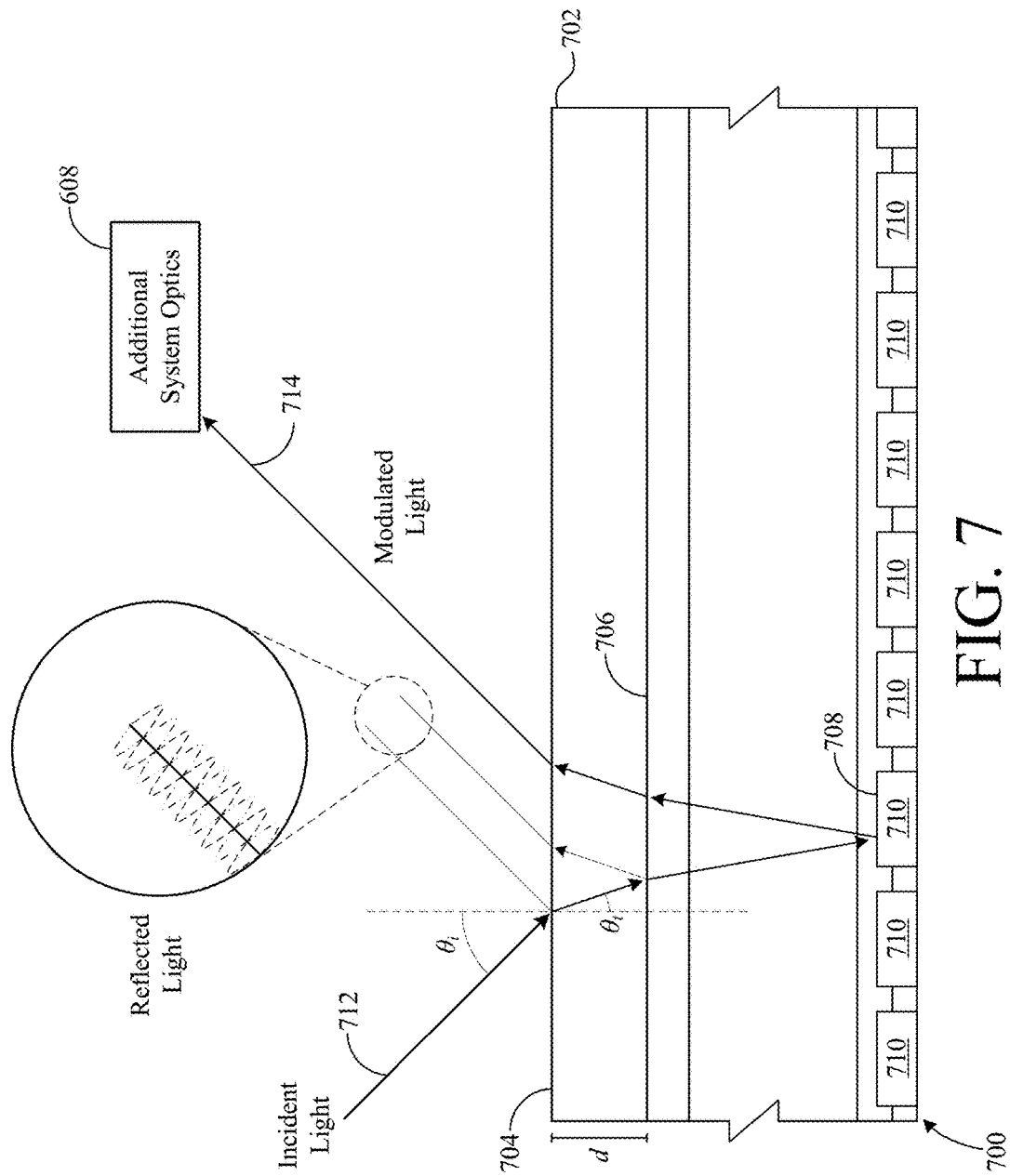
FIG. 7 is a cross-sectional view of an exemplary SLM employing the operational principle of FIG. 6.

FIG. 7 is a cross-sectional view of an example SLM 700 employing the operational principle of destructive interference illustrated in FIG. 6. SLM 700 is substantially similar to SLM 400, except that cover glass 702 has a top surface 702 and a bottom surface 704 that are both parallel to the top surfaces 708 of pixel mirrors 710. In addition, cover glass 702 has a particular thickness (d), which induces a half-wavelength phase difference between light reflected from top surface 704 and light reflected from bottom surface 706 at top surface 704 of cover glass 702. The required thickness of cover glass 702 can be calculated for a variety of wavelengths of light from the angle of incidence, $\theta_i$, of light 712 impinging onto top surface 704 of cover glass 702, as follows.

The phase change, $\delta$, of the transmitted light is given by the following:

$$\delta = \frac{2\pi}{\lambda_0} n_2 x_2$$

where $\lambda_0$ is equal to the wavelength of the transmitted light if it were traveling through a vacuum, $n_2$ is the refractive index of cover glass 702, and $x_2$ is the total distance traveled by the transmitted light within cover glass 702.

The total distance travelled is calculated by forming a triangle consisting of the thickness, d, of cover glass 702 as the leg adjacent to the angle of refraction, $\theta_t$, of the transmitted light and half of the total distance $$\frac{x_2}{2}$$

traveled by the transmitted light as the hypotenuse (because a portion of the transmitted beam reflects from bottom surface 706). Then, $$x_2 = \frac{2d}{\cos\theta_t}$$

From Snell's law, the angle of refraction, $\theta_t$, of the transmitted light can be calculated from the index of refraction of the surrounding material and of cover glass 702 ($n_1$ and $n_2$, respectively) and the angle of incidence $\theta_i$, as shown:

$$n_1 \sin\theta_i = n_2 \sin\theta_t \rightarrow \theta_t = \sin^{-1}\left(\frac{n_1}{n_2}\sin\theta_i\right)$$

Setting $\delta$ equal to $\pi$ and inserting the equation for $x_2$ above, gives:

$$d = \frac{\lambda_0}{4n_2}\cos\theta_t$$

and, finally, $$d = \frac{\lambda_0}{4n_2}\cos\left[\sin^{-1}\left(\frac{n_1}{n_2}\sin\theta_i\right)\right]$$

Cover glass 702 is designed for use with a particular wavelength (or range of wavelengths) of light. With thickness d, as calculated above, cover glass 702 will induce a half wavelength phase-shift on light that reflects from bottom surface 706 and has a wavelength of $\lambda_0$ in a vacuum. Light that reflects from bottom surface 706 is completely out of phase with the light that reflects from top surface 704, and so destructive interference significantly reduces the amount of reflected, unmodulated light in modulated light 714. Therefore, images generated by additional system optics 608 will have higher contrast. It should be noted that, because cosine is a periodic function, there will be an infinite number of solutions that satisfy the above equation for thickness of the cover glass with a given angle of incidence $\theta_i$. Using a cover glass 702 with a thickness that results in a path length of the incident light within cover glass 702 (from top surface 704, to back surface 706, and back to top surface 704) that is less than the coherence length of the incident light contributes to effective destructive interference.

Figure 8:
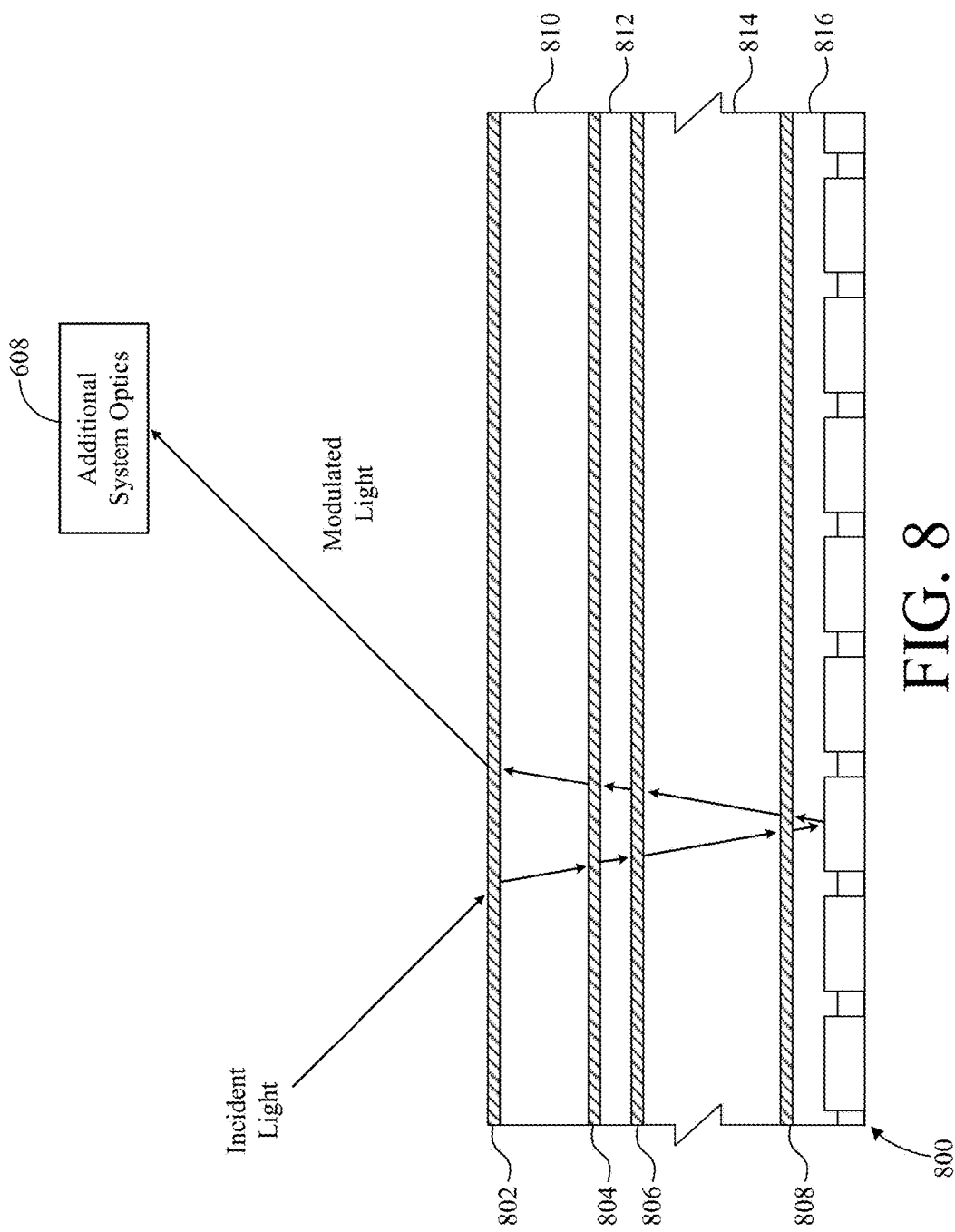
FIG. 8 is a cross-sectional view showing yet another alternate exemplary SLM suitable for use in the projection system of FIG. 2.

FIG. 8 is a cross-sectional view showing yet another alternate example SLM suitable for use in projection system 200. SLM 800 is substantially similar to SLM 700 except that the cover glass 802 of SLM 800 is not necessarily designed to provide destructive interference. Instead, SLM 800 includes a first antireflective coating 802, a second antireflective coating 804, a third antireflective coating 806, and/or a fourth antireflective coating 808. First antireflective coating 802 is disposed above a transparent cover glass 810, and reduces reflections of the incident light from cover glass 810. Second antireflective coating 804 is disposed between cover glass 810 and an electrode 812. Antireflective coating 804 reduces reflections that would otherwise occur at the interface between cover glass 810 and electrode 812. Third antireflective coating 806 is disposed between electrode 812 and a liquid crystal layer 814. Antireflective coating 806 reduces reflections that would otherwise occur at the interface between electrode 812 and liquid crystal layer 814. Fourth antireflective coating 808 is disposed between liquid crystal layer 814 and a dielectric layer 816. Antireflective coating 808 reduces reflections that would otherwise occur at the interface between liquid crystal layer 814 and dielectric layer 816.

In the example, antireflective coatings 802, 804, 806, and 808 are graded-index antireflective coatings. It is advantageous to match the index of refraction of the bottom layer of antireflective coating 806 and of the top layer of antireflective coating 808 to the index of refraction exhibited by liquid crystal layer 814 when it is in its black-state. In alternate examples, antireflective coatings 802, 804, 806, and 808 can also be multilayer thin-film optical coatings, single-layer interference coatings, or any other antireflective coatings, including those now known or yet to be developed. Additionally, any of antireflective layers 802, 804, 806, and/or 808 can be utilized individually or in any combination of antireflective layers 802, 804, 806, and/or 808, depending on the particular application.

Figure 9:
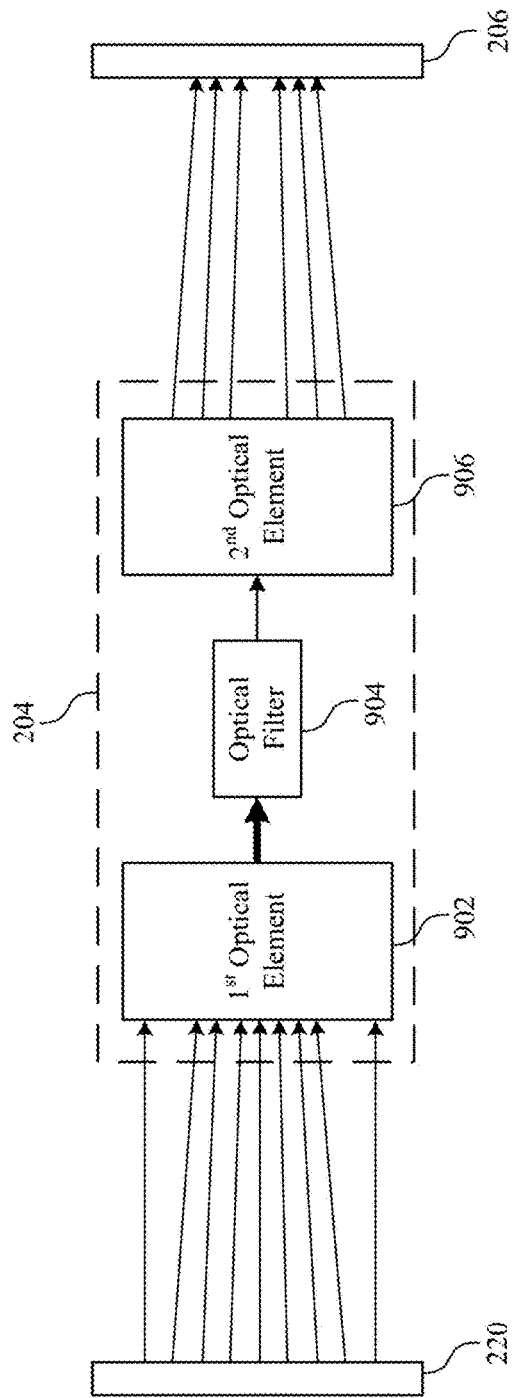
FIG. 9 is a block diagram showing one example of lightfield optics/filters of projection system 200 in greater detail.

FIG. 9 is a block diagram showing one example of lightfield optics/filters 204 of projection system 200 in greater detail. Illumination SLM(s) 220 provide(s) a spatially modulated lightfield to SLM(s) 206, through lightfield optics/filters 204. SLM(s) 220 is/are (a) reflective phase modulator(s) that effectively steer(s) selected portions of the incident light to generate a spatially variant lightfield. The steered light traverses lightfield optics/filters 204, which include a first optical element 902, an optical filter 904, and a second optical element 906. First optical element 902 is, in the example, a Fourier lens, which produces a Fourier transform of the steered light in the Fourier plane. Optical filter 904 is located at or near the Fourier plane of first optical element 902. Optical filter 904 selectively filters portions of the Fourier transform corresponding to reflected, unmodulated light from SLM(s) 220, and second optical element 906 focuses the filtered lightfield on SLM(s) 206. SLM(s) 206 is/are (an) amplitude modulating SLM(s), which generate(s) images by spatially modulating the lightfield produced by SLM(s) 220. Filtering the reflected, unmodulated light from the lightfield generated by SLM(s) 220 results in higher contrast images being generated by SLM(s) 206.

Figure 10A:
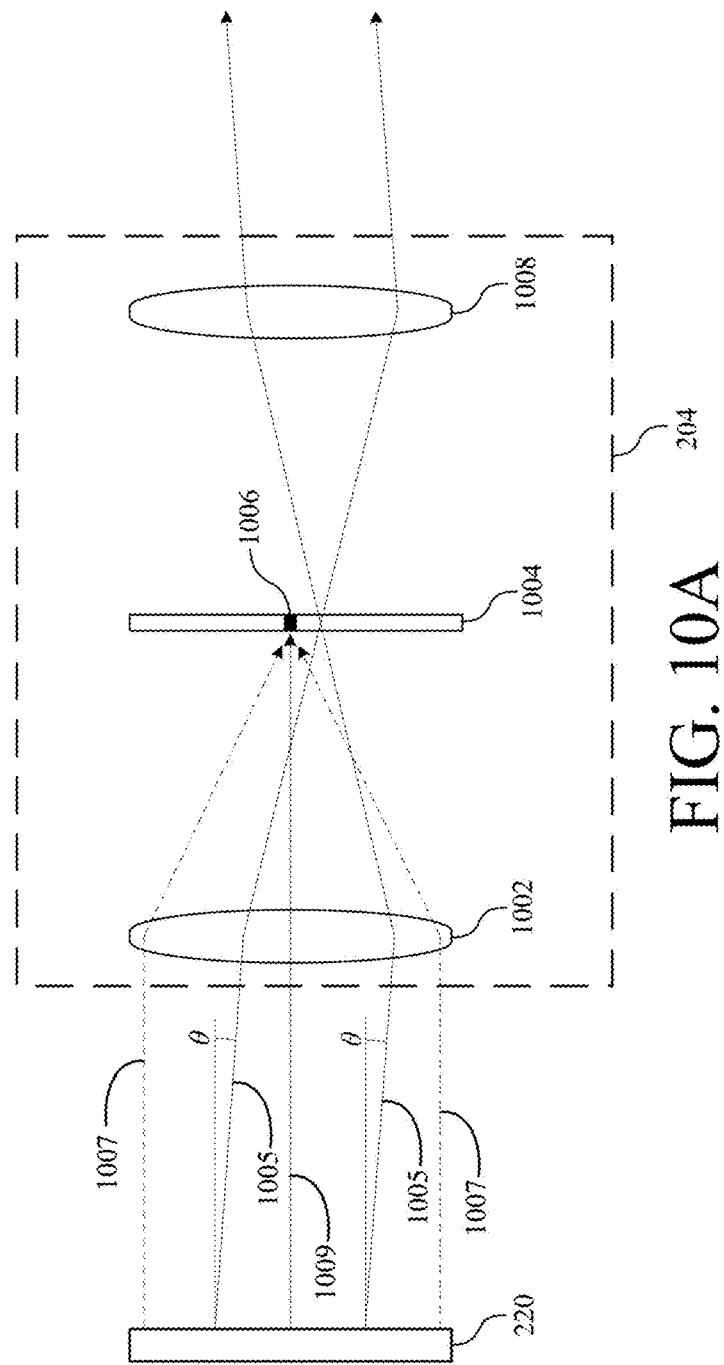
FIG. 10A is a cross-sectional view showing one example of the lightfield optics/filters of FIG. 9 in greater detail.

FIG. 10A is a cross-sectional view showing lightfield optics/filters 204 in more detail. Light incident on SLM(s) 220 is steered toward first optical element 902, which, in this example, is a convex lens 1002. Lens 1002 focuses a Fourier transform of the steered light onto an optical filter 1004 by directing rays to corresponding points of the filter, based on the angle of those rays with respect to the normal of SLM(s) 220. For example, the two rays 1005 having angles equal to $\theta$ with respect to the normal of SLM(s) 220 are redirected to an off-center point on optical filter 1004. The other rays (two unmodulated, reflected rays 1007 and one intentionally un-steered ray 1009), all of which have an angle of 0° with respect to the normal, are redirected to the center of optical filter 1004. The light that is redirected to the center of optical filter 1004 includes the "DC term" of the modulated lightfield and the unmodulated, reflected light. Optical filter 1004 is a transparent optical element having an opaque, light block disc 1006 positioned in the center, which blocks the "DC term" of the modulated lightfield and the unmodulated, reflected light. Thus, a user can eliminate unwanted light from the system by leaving it un-steered. Light that is not blocked continues onto second optical element 906, which, in this example, is a convex lens 1008. Lens 1008 focuses the, now diverging, light from lens 1002 back to its initial trajectory toward SLM(s) 206 (FIG. 9).

In the example, optical filter 1004 is placed at the Fourier plane of lightfield optics/filters 204 to allow precise spatial filtering of the steered lightfield. In alternate examples, optical filter 1004 can be placed in other locations between lenses 1002 and 1008, in order to filter less of the DC term light. Additionally, optical filter 1004 can be made slidable with respect to lenses 1002 and 1008, in order to filter more or less of the DC term, as needed for each particular application. In addition, light block disc 1006 can be a light block of various shapes and sizes, such as one or more concentric rings.

An advantage of some examples of the present disclosure is the ability to preserve the DC term of the desired lightfield, while at the same time filtering out the reflected, unmodulated light ($0^{th}$ order light) from the lightfield. An example method for preventing the desired DC term light from being blocked by optical filter 1004 includes steering the entire image at a non-zero angle with respect to the normal of SLM 220. To form an image, a steering solution is calculated by determining a steering angle for light from each region of SLM 220 (e.g. one or more pixels). The range of steering angles for the solution is constrained to the interval $[-\theta, 74]$, where $\theta$ is some fraction of the maximum steering angle that SLM 220 is capable of producing. In most examples, the solution will include some steering angles that are parallel to the normal of SLM 220. However, adjusting the steering angles of the solution to steer the entire lightfield by a predetermined amount can ensure that the adjusted solution will not include any angles that will be filtered out with the reflected, unmodulated ($0^{th}$ order) light. This technique will be described in more detail with reference to FIGS. 10B and 10C.

Figure 10B:
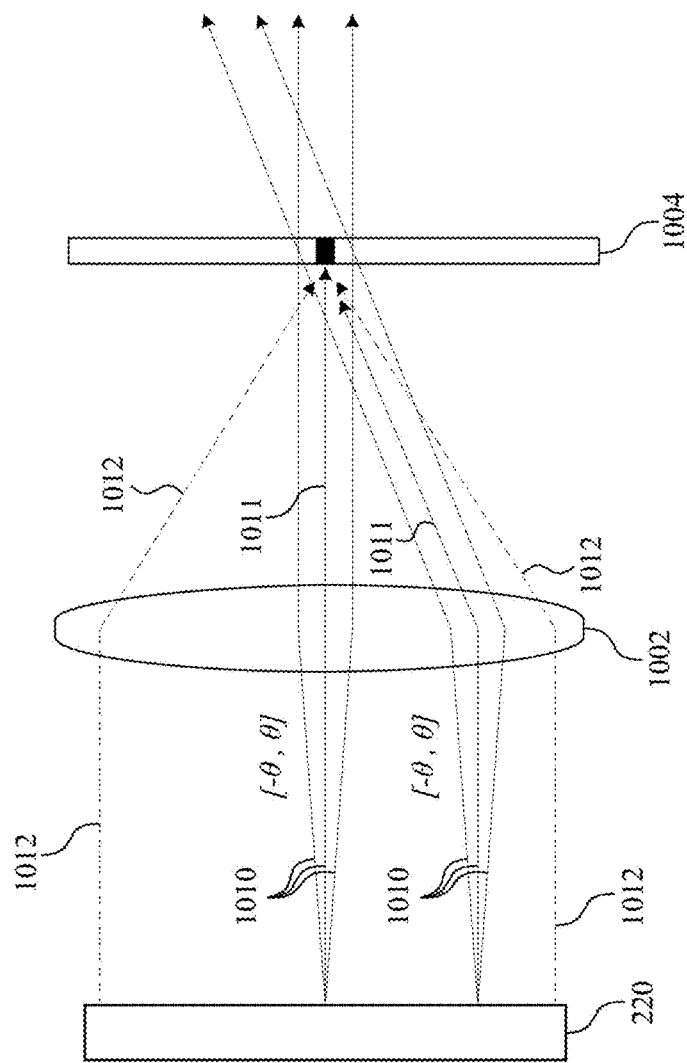
FIG. 10B is a cross-sectional view showing potential undesirable filtering of modulated light.

FIG. 10B is a cross-sectional view illustrating the constrained range of steering angles available to SLM 220 in the initial image solution. Imaging beams 1010 range in angle from −θ to θ, including a zero angle in between. Because the zero-angle light 1011 is traveling perpendicular with respect to the surface of SLM 220, it is blocked by optical filter 1004, along with reflected beams 1012, which cannot be steered.

Figure 10C:
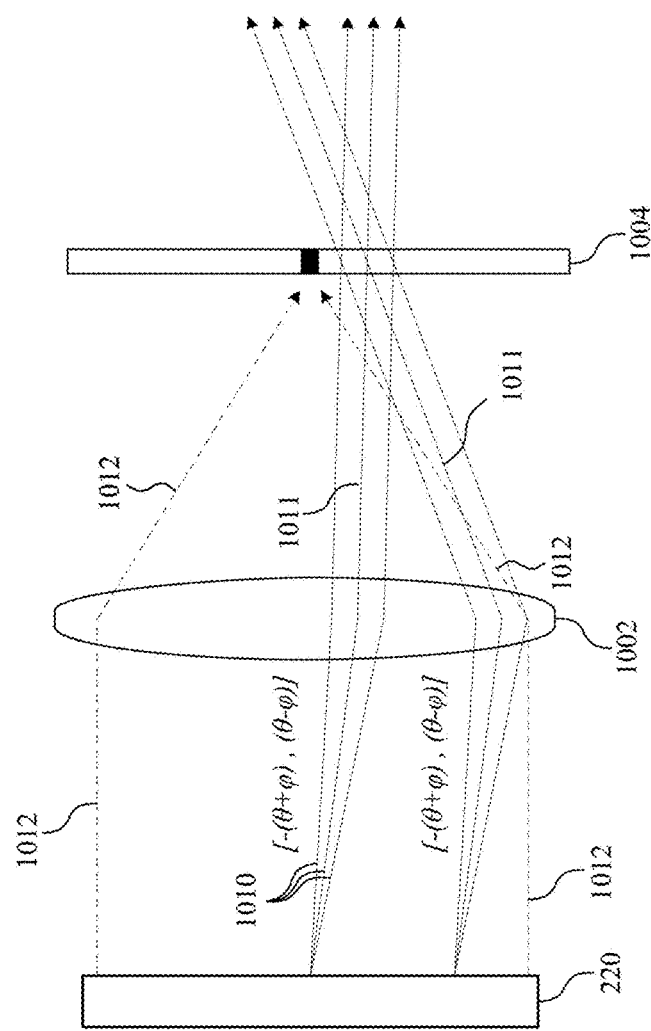
FIG. 10C is a cross-sectional view illustrating the avoidance of undesirable filtering by steering all modulated light (the entire lightfield) by a predetermined angle.

FIG. 10C is a cross-sectional view illustrating additional steering of the initial image solution of FIG. 10B. In order to retain the un-steered light 1011 in the image solution, the entire image is steered by an additional angle ±φ, where φ>θ and φ+θ is smaller than the maximum steering angle that SLM 220 is capable of producing. Imaging beams 1010 are each steered at an additional angle −φ, and now range in angle from (θ−φ) to −(θ+φ). Because the entire interval [(θ−φ),−(θ+φ)] is negative, none of the rays of the steered solution are normal to SLM 220 and, therefore, none of the image (including the DC term) is inadvertently blocked by optical filter 1004. In this way, reflected ($0^{th}$ order) light 1012 can be removed from an image, without affecting the desired image itself.

This technique for preserving the DC term of the lightfield has been described as a two-step process for ease of understanding. In particular, the technique has been described as first calculating a steering angle within the confined range to generate the desired light field, and then steering the entire lightfield by a adjusting the steering angles by a predetermined amount. However, it should be understood that these steps can be consolidated into a single steering angle computation that yields the adjusted steering angles in the first instance. It is not necessary to generate the initial steering angles, and then adjust those steering angles in a separate step.

Figure 11A:
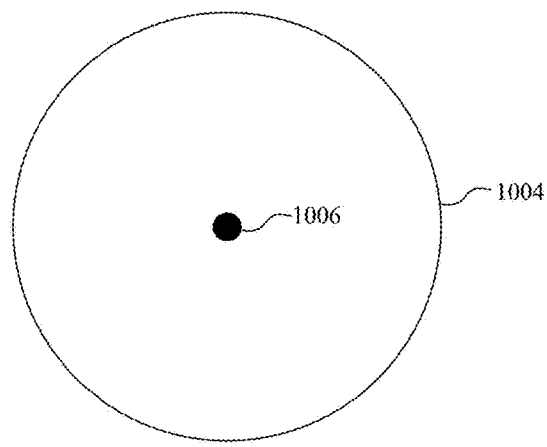
FIG. 11A is a front view showing the optical filter of FIG. 10A in more detail.

FIG. 11A is a front view showing optical filter 1004 in more detail. Optical filter 1004 is a transparent, circular element with light block disc 1006 centered in the middle. In a particular example, optical filter 1004 is positioned so that light block disc is centered on the optical axis of lens 1002. Light block disc 1006 blocks light corresponding to the DC term of the Fourier transform of the steered lightfield.

Figure 11B:
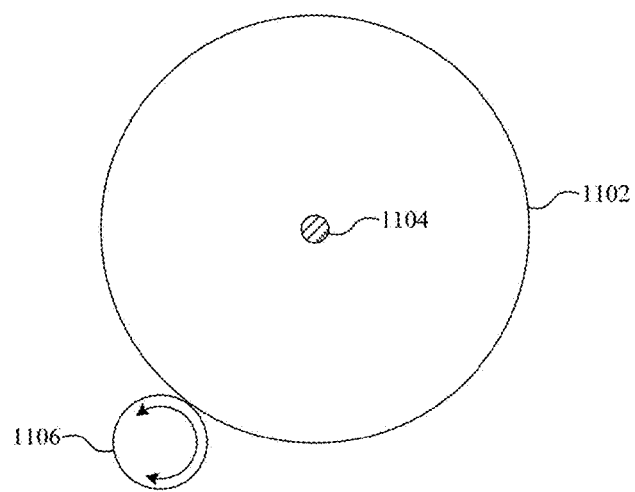
FIG. 11B is a front view showing an alternate optical filter.

FIG. 11B is a front view showing an alternate optical filter 1102. Optical filter 1102 is a transparent circular element with a polarizing disc 1104 centered in the middle. For use in systems with some level of light polarization, optical filter 1102 can provide adjustable attenuation of light corresponding to the DC term of the Fourier transform of the steered lightfield. Optical filter 1102 is rotationally coupled to a rotary actuator 1106, which selectively rotates in either direction. Actuator 1106 rotates optical filter 1102 between 0° and 90° in order to alter the polarization orientation of polarizing disc 1104, with respect to the incident lightfield. Thus, the amount of light corresponding to the DC term that passes through optical filter 1102 can be attenuated by driving actuator 1106.

Figure 12:
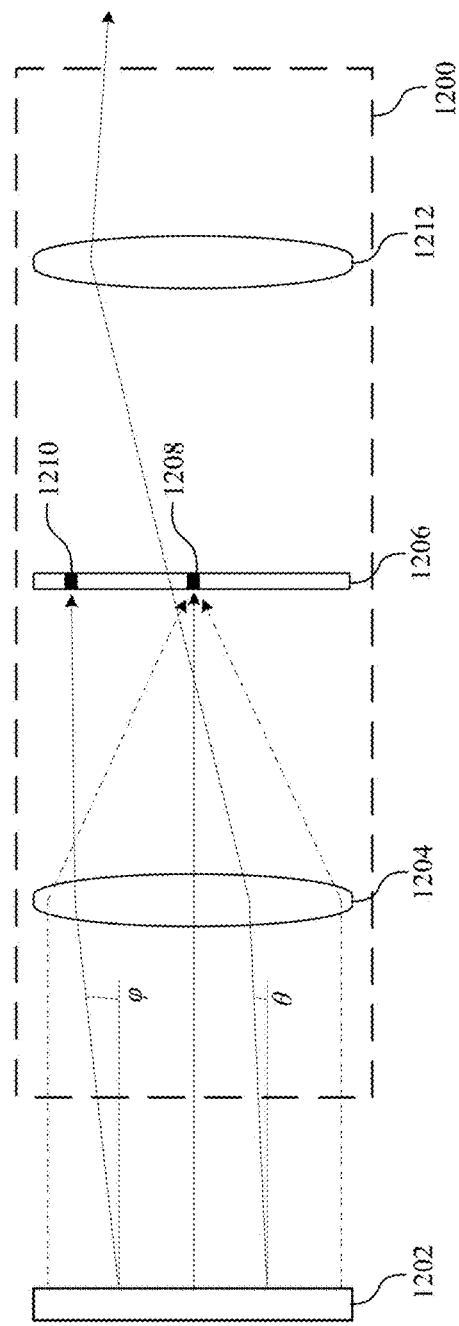
FIG. 12 is a cross-sectional view showing alternate lightfield optics/filters.

FIG. 12 is a cross-sectional view showing an alternate lightfield optics/filters 1200. Lightfield optics/filters 1200 are substantially similar to lightfield optics/filters 204 of FIG. 10A, except that filter 1206 is configured to additionally block light that is steered in a particular, predetermined direction. An example SLM 1202 (e.g. SLM(s) 220) steers incident light to produce a desired lightfield. A first convex lens 1204, which is substantially similar to lens 1002, focuses the steered light toward an optical filter 1206 located at or near the Fourier plane. Filter 1206 is positioned with light blocking disc 1208 at or near the optical axis of lens 1204. Optical filter 1206 is similar to optical filter 1004, except that optical filter 1206 includes a centered light blocking disc 1208 in combination with an additional light blocking disc 1210 that is spaced apart from light blocking disc 1208 at a predetermined position. Light blocking disc 1208 functions in the same manner as light blocking disc 1006. Light blocking disc 1210 is positioned to block light steered at a particular angle, such as, for example, light with an angle of φ with respect to the normal of SLM 1202, as shown in FIG. 12. As a result, unwanted light can be steered at angle φ in order to remove the light from the lightfield, using light blocking disc 1210 as a light dump. A second convex lens 1212 then focuses the, now diverging, light from lens 1204 back to its initial trajectory toward additional system optics (not shown).

Figure 13:
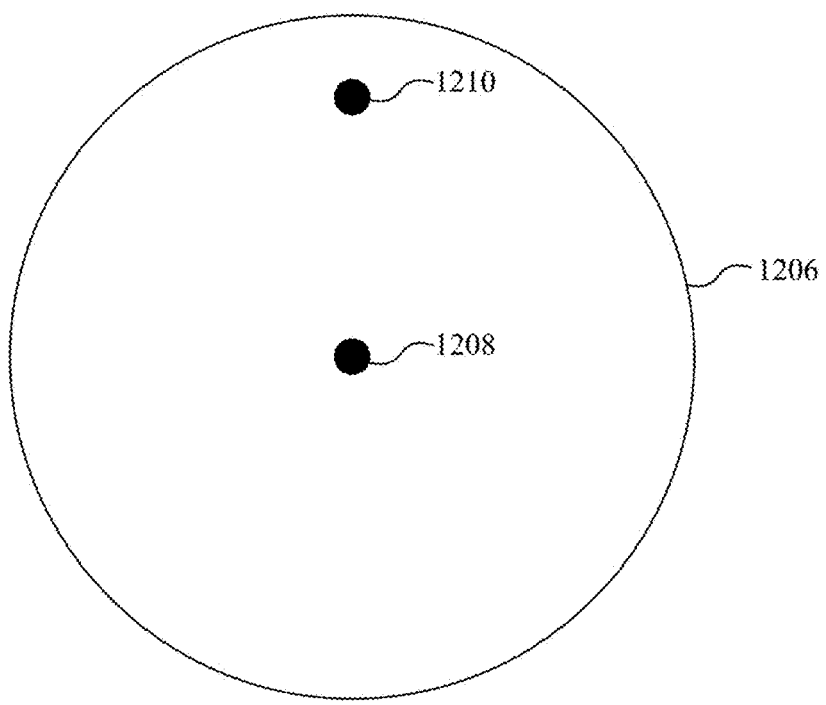
FIG. 13 is a front view showing the optical filter of FIG. 12 in more detail.

FIG. 13 is a front view showing optical filter 1206 in more detail. Optical filter 1206 is a transparent, circular element with light blocking disc 1208 located in the center and light block disc 1210 located in predetermined position near peripheral portion of filter 1206. Light blocking disc 1208 blocks the reflected, unmodulated ($0^{th}$ order) light, and light blocking disc 1210 blocks light steered at the predetermined angle φ.

Figure 14:
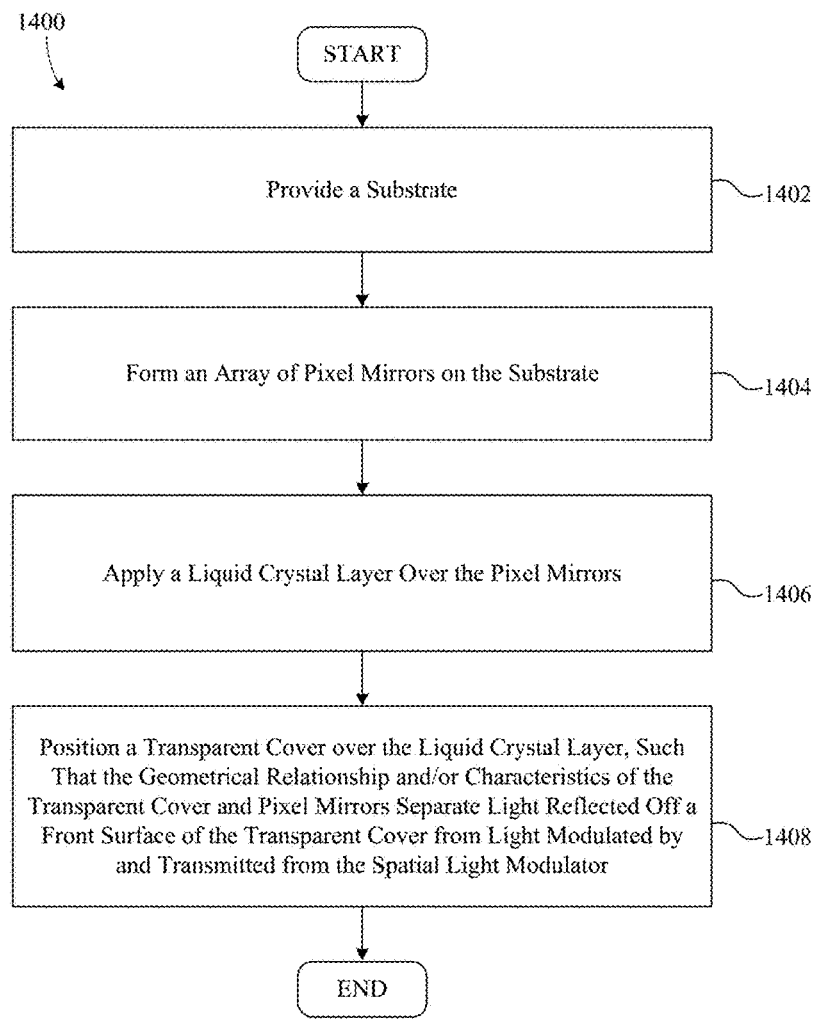
FIG. 14 is a flowchart summarizing an exemplary method for manufacturing a high contrast SLM.

FIG. 14 is a flow chart summarizing an example method 1400 for manufacturing an SLM. First, in a first step 1402, a substrate is provided. Then, in a second step 1404, an array of pixel mirrors is formed on the substrate. Next, in a third step 1406, a liquid crystal layer is applied over the pixel mirrors. Finally, in a fourth step 1408, a transparent cover is positioned over the liquid crystal layer, such that the geometrical relationship and/or characteristics of the transparent cover and the pixel mirrors separate light reflected off a front surface of the transparent cover from light modulated by and transmitted from the SLM.

Figure 15:
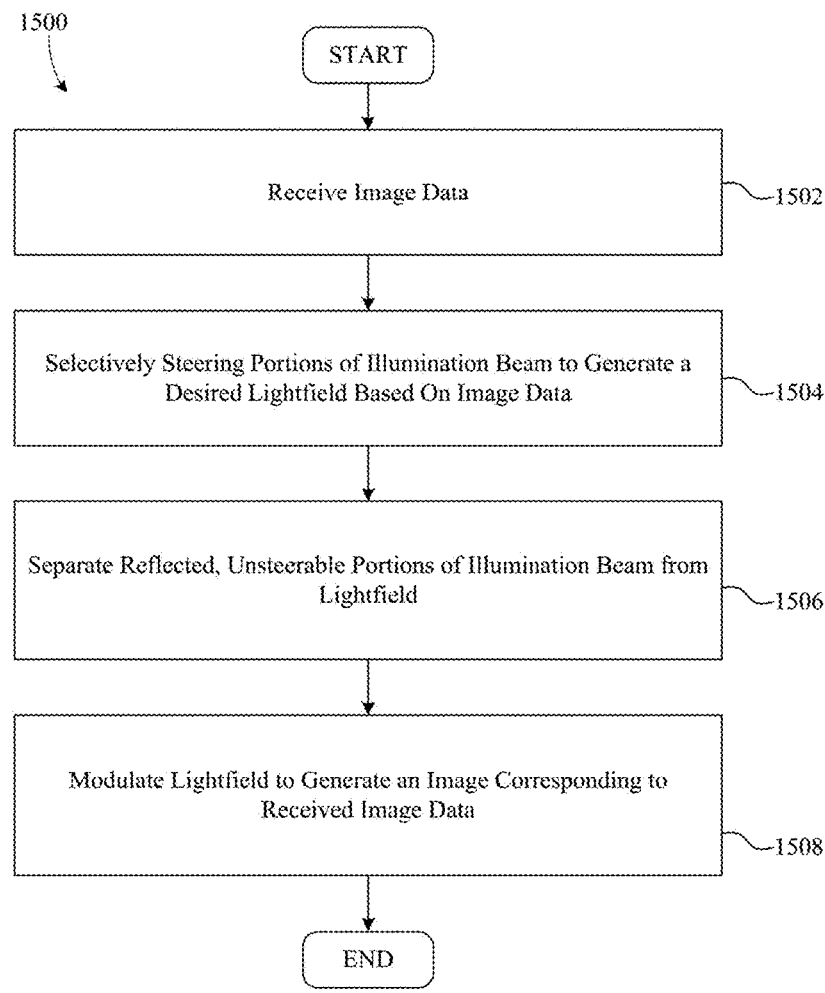
FIG. 15 is a flowchart summarizing a method for generating a high contrast lightfield.

FIG. 15 is a flowchart summarizing an example method 1500 of generating a high contrast lightfield. In a first step 1502, image data is received. Then, in a second step 1504, portions of an illumination beam are selectively steered to generate a lightfield based at least in part on the image data. Next, in a third step 1506, reflected, unsteerable portions of the illumination beam are separated from the lightfield. Then, in a fourth step 1508, the lightfield is modulated to generate an image corresponding to the received image data.

The description of particular examples of the present disclosure is now complete. Many of the described features may be substituted, altered or omitted without departing from the scope of the present disclosure. For example, alternate optical filters (e.g., non-transparent filters having absorptive, dichroic, etc. properties in addition to selective light blocking properties), may be substituted for optical filters 1004, 1102, and 1206. As another example, SLMs 206, 500, 602, and 800 may have more or fewer layers, as needed for particular applications. These and other deviations from the particular examples shown will be apparent to those skilled in the art, particularly in view of the foregoing disclosure.

Various aspects of the present disclosure may be appreciated from the following enumerated examples (EEs):

1. A spatial light modulator, comprising:
   a substrate;
   a pixel mirror formed on said substrate, said pixel mirror being configured to reflect light that is modulated by said spatial light modulator; and
   a transparent cover disposed over said pixel mirror and having a geometrical relationship with said pixel mirror; and wherein a first portion of light incident on said transparent cover is reflected as unmodulated light;
a second portion of light incident on said transparent cover passes through said transparent cover, is reflected by said pixel mirror, and is transmitted by said transparent cover as modulated light; and
said geometrical relationship is such that said unmodulated light is separated from said modulated light.

2. The spatial light modulator of EE 1, further comprising:
a modulation layer disposed over said pixel mirror and configured to modulate light based at least in part on an operational voltage asserted on said pixel mirror; and wherein
said second portion of light incident on said transparent cover passes through said transparent cover, passes through said modulation layer, is reflected by said pixel mirror, passes through said modulation layer again, and is transmitted by said transparent cover as modulated light.

3. The spatial light modulator of EE 1 or EE 2, wherein said geometrical relationship is configured to introduce an angular difference between said unmodulated light and said modulated light.

4. The spatial light modulator of any preceding EE, wherein said geometrical relationship includes:
said pixel mirror having a top surface oriented substantially parallel with respect to said substrate; and
said transparent cover having a top surface oriented at a non-zero angle with respect to said substrate.

5. The spatial light modulator of any one of EEs 1 to 3, wherein said geometrical relationship includes:
said pixel mirror having a top surface oriented at a non-zero angle with respect to said substrate; and
said transparent cover having a top surface oriented substantially parallel with respect to said substrate.

6. The spatial light modulator of any preceding EE, wherein said geometrical relationship eliminates at least some of said unmodulated light by destructive interference.

7. The spatial light modulator of any preceding EE, wherein said geometrical relationship includes:
said transparent cover having a top surface and a bottom surface, said top surface being oriented substantially parallel with respect to said bottom surface; and
said top surface and said bottom surface being separated by a particular distance, such that some of said unmodulated light that reflects from said top surface and some of said unmodulated light that reflects from said bottom surface have a predetermined phase difference.

8. The spatial light modulator of EE 7, wherein said phase difference is equal to one half of a wavelength of said incident light.

9. The spatial light modulator of any preceding EE, further comprising:
a modulation layer disposed between said transparent cover and said pixel mirror;
an electrode layer formed between said modulation layer and said transparent cover; and
an anti-reflective coating positioned between said electrode layer and said transparent cover or between said electrode layer and said modulation layer.

10. The spatial light modulator of any preceding EE, further comprising:
a modulation layer disposed between said transparent cover and said pixel mirror;
an electrode layer formed between said modulation layer and said transparent cover;
a first anti-reflective coating positioned between said electrode layer and said transparent cover; and
a second anti-reflective coating positioned between said electrode layer and said modulation layer.

11. The spatial light modulator of EE 9 or EE 10, wherein:
said modulation layer is a liquid crystal layer; and
said second anti-reflective coating is optimized for said liquid crystal layer being in its black state.

12. The spatial light modulator of any preceding EE, wherein said pixel mirror is movable with respect to said substrate.

13. A method for manufacturing a spatial light modulator, said method comprising:
providing a substrate;
forming a pixel mirror on said substrate, said pixel mirror being configured to reflect light modulated by said spatial light modulator; and
providing a transparent cover over said pixel mirror, said transparent cover reflecting a first portion of light incident on said transparent cover as unmodulated light, transmitting a second portion of light incident on said transparent cover toward said pixel mirror, and transmitting said second portion of light reflected from said pixel mirror as modulated light; and wherein
said pixel mirror and said transparent cover have a geometrical relationship such that said unmodulated light is separated from said modulated light.

14. The method of EE 13, further comprising providing a modulation layer between said transparent cover and said pixel mirror, said modulation layer operable to modulate light passing therethrough based at least in part on an operational voltage asserted on said pixel mirror.

15. The method of EE 13 or EE 14, wherein said geometrical relationship is configured to introduce an angular separation between said unmodulated light and said modulated light.

16. The method of any one of EEs 13 to 15, wherein said geometrical relationship includes:
said pixel mirror having a top surface oriented substantially parallel with respect to said substrate; and
said transparent cover having a top surface oriented at a nonzero angle with respect to said substrate.

17. The method of any one of EEs 13 to 16, wherein said geometrical relationship includes:
said pixel mirror having a top surface oriented at a nonzero angle with respect to said substrate; and
said transparent cover having a top surface oriented substantially parallel with respect to said substrate.

18. The method of any one of EEs 13 to 17, wherein said geometrical relationship eliminates at least some of said unmodulated light.

19. The method of any one of EEs 13 to 18, wherein said geometrical relationship includes:
said transparent cover having a top surface and a bottom surface, said top surface being oriented substantially parallel with respect to said bottom surface; and
said top surface and said bottom surface being separated by a particular distance, such that some of said unmodulated light that reflects from said top surface and some of said unmodulated light that reflects from said bottom surface have a predetermined phase difference.

20. The method of EE 19, wherein said phase difference is equal to one half of a wavelength of said incident light.

21. The method of any one of EEs 13 to 20, further comprising:

forming a modulation layer between said transparent cover and said pixel mirror;

forming an electrode layer between said modulation layer and said transparent cover; and forming a first anti-reflective coating between said electrode layer and said transparent cover or between said electrode layer and said modulation layer.

22. The method of any one of EEs 13 to 21, further comprising:

forming a modulation layer between said transparent cover and said pixel mirror;

forming an electrode layer between said modulation layer and said transparent cover;

forming a first anti-reflective coating between said electrode layer and said transparent cover; and forming a second anti-reflective coating between said electrode layer and said modulation layer.

23. The method of EE 21 or EE 22, wherein:

said step of forming a modulation layer over said pixel mirror includes applying a liquid crystal layer above said pixel mirror; and said second anti-reflective coating is optimized when said liquid crystal layer is in its black state.

24. An image projector comprising:

a controller operative to receive image data and to provide control signals based at least in part on said image data;

a light source configured to provide an illumination beam;

a phase modulating spatial light modulator (SLM) configured to selectively steer portions of said illumination beam to create a modulated illumination beam responsive to signals from said controller, said modulated illumination beam including light modulated by said phase modulating SLM and unmodulated light reflected from said phase modulating SLM;

an optical component disposed in the path of said modulated illumination beam;

a filter disposed at or near a Fourier plane of said optical component and operative to at least partially block said unmodulated light reflected from said phase modulating SLM to create a filtered, modulated illumination beam; and an amplitude modulating spatial light modulator disposed in said filtered, modulated illumination beam and configured to selectively modulate the amplitude of portions of said filtered, modulated illumination beam to create an imaging beam.

25. The image projector of EE 24, wherein said filter includes an opaque region at a center of said filter.

26. The image projector of EE 24 or EE 25, wherein said filter includes an opaque region disposed on an optical axis of said optical component.

27. The image projector of any one of EEs 24 to 26, wherein said filter includes a polarized region at a center of said filter.

28. The image projector of EE 27, wherein said filter is rotatable about an axis passing through said polarized region.

29. The image projector of any one of EEs 24 to 28, wherein:

said filter includes an opaque region displaced from an optical axis of said optical component; and said phase modulating SLM is operative to steer unwanted light toward said opaque region.

30. The image projector of EE 29, wherein said filter includes a second opaque region disposed on said optical axis of said optical component.

31. The image projector of any one of EEs 24 to 30, wherein:

said filter includes an opaque region disposed to block said unmodulated light; and said phase modulating SLM steers unwanted modulated light toward said opaque region.

32. The image projector of any one of EEs 24 to 31, wherein said controller is configured to:

determine a first set of steering angles required to provide a desired light field based at least in part on said received image data, said first set of steering angles being confined to a predetermined range of angles;

add a predetermined lightfield steering angle to every steering angle of said first set of steering angles contributing to said lightfield to generate a set of adjusted steering angles, said adjusted steering angles all having values that differ from zero by a predetermined amount; and provide control signals to said phase modulating SLM causing said modulated light to be steered at said adjusted steering angles, thereby preventing said filter from blocking a DC component of said lightfield.

33. The image projector of EE 32, wherein:

said first set of steering angles is in a range of $-\theta$ to $+\theta$;
said predetermined lightfield steering angle is $\Phi$; and
$|\Phi|>|\theta|$.

34. A method of improving contrast in a projected image, said method including:

receiving image data;

selectively steering portions of an illumination beam to generate a desired lightfield based at least in part on said image data;

separating reflected, unsteerable portions of said illumination beam from said lightfield; and modulating said lightfield to generate an image corresponding to said received image data.

35. The method of EE 34, wherein said step of separating includes introducing an angular disparity between said steered portions and said reflected, unsteerable portions of said illumination beam.

36. The method of EE 34 or EE 35, wherein said step of separating includes reducing said reflected, unsteerable light by destructive interference.

37. The method of any one of EEs 34 to 36, wherein said step of separating includes filtering said reflected, unsteerable portions of said illumination beam from said steered portions of said illumination beam.

38. The method of EE 37, wherein said filtering includes preserving the DC component of said lightfield.

39. The method of EE 38, wherein preserving said DC component of said lightfield includes steering all of said lightfield by an amount sufficient to ensure that all portions of said illumination beam generating said lightfield are steered at angles that differ from zero by a predetermined amount.

40. The method of EE 38, wherein preserving said DC component of said lightfield includes:

determining a first set of steering angles required to generate said desired light field based at least in part on said received image data, said first set of steering angles being confined to a predetermined range of angles; and adding a predetermined lightfield steering angle to every steering angle of said first set of steering angles contributing to said lightfield to generate a set of adjusted steering angles, said adjusted steering angles all having values that differ from zero by a predetermined amount.

41. The method of EE 40, wherein:
said first set of steering angles is in a range of −θ to +θ;
said predetermined lightfield steering angle is Φ; and
|Φ|>|θ|.

We claim:

1. An image projector comprising:
a controller operative to receive image data and to provide control signals based at least in part on said image data;
a light source configured to provide an illumination beam;
a phase modulating spatial light modulator (SLM) configured to selectively steer portions of said illumination beam to create a modulated illumination beam responsive to signals from said controller, said modulated illumination beam including light modulated by said phase modulating SLM and unmodulated light reflected from said phase modulating SLM;
an optical component disposed in the path of said modulated illumination beam;
a filter disposed at or near a Fourier plane of said optical component and operative to at least partially block said unmodulated light reflected from said phase modulating SLM to create a filtered, modulated illumination beam; and
an amplitude modulating spatial light modulator disposed in said filtered, modulated illumination beam and configured to selectively modulate the amplitude of portions of said filtered, modulated illumination beam to create an imaging beam.

2. The image projector of claim 1, wherein said filter includes an opaque region at a center of said filter.

3. The image projector of claim 1, wherein said filter includes an opaque region disposed on an optical axis of said optical component.

4. The image projector of claim 1, wherein said filter includes a polarized region at a center of said filter.

5. The image projector of claim 4, wherein said filter is rotatable about an axis passing through said polarized region.

6. The image projector of claim 1, wherein: said filter includes an opaque region displaced from an optical axis of said optical component; and
said phase modulating SLM is operative to steer unwanted light toward said opaque region.

7. The image projector of claim 6, wherein said filter includes a second opaque region disposed on said optical axis of said optical component.

8. The image projector of claim 1, wherein:
said filter includes an opaque region disposed to block said unmodulated light; and said phase modulating SLM steers unwanted modulated light toward said opaque region.

9. The image projector of claim 1, wherein said controller is configured to:
determine a first set of steering angles required to provide a desired light field based at least in part on said received image data, said first set of steering angles being confined to a predetermined range of angles;
add a predetermined lightfield steering angle to every steering angle of said first set of steering angles contributing to said lightfield to generate a set of adjusted steering angles, said adjusted steering angles all having values that differ from zero by a predetermined amount; and
provide control signals to said phase modulating SLM causing said modulated light to be steered at said adjusted steering angles, thereby preventing said filter from blocking a DC component of said lightfield.

10. The image projector of claim 1, wherein said filter is a transparent circular element with a light block at the center.

11. The image projector of claim 1, wherein said filter is slideable with respect to the optical component.

12. The image projector of claim 1, wherein said optical component is a Fourier lens.

13. A method of improving contrast in a projected image, said method including:
receiving image data;
selectively steering portions of an illumination beam to generate a desired lightfield based at least in part on said image data;
separating reflected, unsteerable portions of said illumination beam from said lightfield; and
modulating said lightfield to generate an image corresponding to said received image data wherein said step of separating is performed via filtering that preserves the DC component of said lightfield.

14. The method of claim 13, wherein preserving said DC component of said lightfield
includes steering all of said lightfield by an amount sufficient to ensure that all portions of said illumination beam generating said lightfield are steered at angles that differ from zero by a predetermined amount.

15. The method of claim 13, wherein preserving said DC component of said lightfield includes:
determining a first set of steering angles required to generate said desired light field based at least in part on said received image data, said first set of steering angles being confined to a predetermined range of angles; and
adding a predetermined lightfield steering angle to every steering angle of said first set of steering angles contributing to said lightfield to generate a set of adjusted steering angles, said adjusted steering angles all having values that differ from zero by a predetermined amount.

16. The method of claim 15, wherein:
said first set of steering angles is in a range of −θ to +θ;
said predetermined lightfield steering angle is Φ; and
|Φ|>|θ|.

17. The method of claim 13, wherein said step of separating is performed via filtering that attenuates the DC component of said lightfield.

18. The method of claim 17, wherein attenuating said DC component of said lightfield includes rotating a filter comprising a polarizing element, to alter the polarization orientation of the polarizing element with respect to the incident lightfield.

19. The method of claim 18, wherein the filter is a transparent circular element with a polarizing disc.

* * * * *